United States Patent
Asanuma et al.

(10) Patent No.: US 10,323,143 B2
(45) Date of Patent: Jun. 18, 2019

(54) POLYVINYL ACETAL COMPOSITION

(71) Applicant: KURARAY CO., LTD., Kurashiki-shi (JP)

(72) Inventors: Yoshiaki Asanuma, Kurashiki (JP); Koichiro Isoue, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 174 days.

(21) Appl. No.: 14/779,220

(22) PCT Filed: Mar. 13, 2014

(86) PCT No.: PCT/JP2014/056736
§ 371 (c)(1),
(2) Date: Sep. 22, 2015

(87) PCT Pub. No.: WO2014/148360
PCT Pub. Date: Sep. 25, 2014

(65) Prior Publication Data
US 2016/0053102 A1      Feb. 25, 2016

(30) Foreign Application Priority Data

Mar. 22, 2013 (JP) ................. 2013-061056
Mar. 22, 2013 (JP) ................. 2013-061057
Mar. 22, 2013 (JP) ................. 2013-061058

(51) Int. Cl.
*C08L 29/14* (2006.01)
*C08K 5/103* (2006.01)
*C08L 67/00* (2006.01)
*C08L 71/02* (2006.01)
*B32B 17/10* (2006.01)

(52) U.S. Cl.
CPC ........ *C08L 29/14* (2013.01); *B32B 17/10605* (2013.01); *B32B 17/10761* (2013.01); *C08K 5/103* (2013.01); *C08L 67/00* (2013.01); *C08L 71/02* (2013.01); *C08L 2205/025* (2013.01); *C08L 2205/035* (2013.01)

(58) Field of Classification Search
CPC . C08L 29/14; C08L 2205/02; C08L 2205/025
See application file for complete search history.

(56) References Cited

U.S. PATENT DOCUMENTS

| | | | | |
|---|---|---|---|---|
| 2,637,706 A | * | 5/1953 | Bergstedt | C09J 129/14 524/310 |
| 2002/0136906 A1 | | 9/2002 | Schohi et al. | |
| 2008/0064775 A1 | * | 3/2008 | Wheeler | C08J 9/103 521/83 |
| 2011/0049434 A1 | * | 3/2011 | Ootsuki | C04B 35/04 252/500 |
| 2011/0151269 A1 | | 6/2011 | Hatta et al. | |
| 2012/0021231 A1 | | 1/2012 | Hirota et al. | |
| 2012/0202070 A1 | * | 8/2012 | Asanuma | B32B 17/10761 428/412 |
| 2012/0288722 A1 | | 11/2012 | Iwamoto et al. | |
| 2013/0202863 A1 | * | 8/2013 | Shimamoto | B32B 17/10036 428/212 |
| 2013/0225741 A1 | * | 8/2013 | Ootsuki | C09D 11/00 524/379 |
| 2014/0363651 A1 | * | 12/2014 | Lu | C08L 29/14 428/217 |
| 2016/0271911 A1 | * | 9/2016 | Kusudou | C08L 29/14 |

FOREIGN PATENT DOCUMENTS

| | | |
|---|---|---|
| EP | 2 463 336 A1 | 6/2012 |
| JP | 10-25390 A | 1/1998 |
| JP | 2002-104878 A | 4/2002 |
| JP | 2006-28382 A | 2/2006 |
| JP | 2011-84468 A | 4/2011 |

(Continued)

OTHER PUBLICATIONS

International Search Report dated Jun. 10, 2014 in PCT/JP14/056736 Filed Mar. 13, 2014.
Extended European Search Report dated Sep. 16, 2016 in Patent Application No. 14767399.0.
Japanese Office Action dated Nov. 27, 2018 in Japanese Patent Application No. 2017-232196 (with English translation), 5 pages.
Notification of Reasons for Refusal, Patent Application No. 2018-105522, dated Apr. 2, 2019, with English Translation.

*Primary Examiner* — Nicholas E Hill

(74) *Attorney, Agent, or Firm* — Oblon, McClelland, Maier & Neustadt, L.L.P.

(57) ABSTRACT

An object is to provide a polyvinyl acetal composition which includes polyvinyl acetals having different average amounts of remaining hydroxyl groups and from which a sheet having excellent transparency can be molded.

A polyvinyl acetal composition comprising 3 to 100 parts by mass of polyvinyl acetal (B) with respect to 100 parts by mass of polyvinyl acetal (A), and 0.05 to 0.75 times by mass of compound (C) with respect to the total mass of polyvinyl acetal (A) and polyvinyl acetal (B). The polyvinyl acetal (A) has an average amount of remaining hydroxyl groups of X mol % (X is a positive number), the polyvinyl acetal (B) has an average amount of remaining hydroxyl groups of Y mol % (Y is a positive number), and $|X-Y| \geq 3$ is satisfied. The compound (C) is selected from a group consisting of a polyester containing a hydroxyl group, a polyalkylene oxide, and an ester compound containing a hydroxyl group, the ester compound containing a hydroxyl group being an ester compound of one molecule of an m-valent alcohol (m represents an integer of 1 to 3) and n molecules (n represents an integer of 1 to m) of a monovalent carboxylic acid.

20 Claims, No Drawings

(56) References Cited

FOREIGN PATENT DOCUMENTS

| | | | | |
|---|---|---|---|---|
| JP | 2011-146647 A | 7/2011 | | |
| JP | 2011-225449 A | 11/2011 | | |
| JP | 2012-148939 A | 8/2012 | | |
| JP | 5465812 B1 * | 4/2014 | ............ | C08K 5/103 |
| JP | 5469279 B1 * | 4/2014 | ............ | B32B 27/22 |
| JP | 5469288 B1 | 4/2014 | | |
| WO | 00/18698 A1 | 4/2000 | | |
| WO | 2010/008053 A1 | 1/2010 | | |
| WO | WO 2010146107 A1 * | 12/2010 | ....... | B32B 17/10688 |
| WO | 2011/016495 A1 | 2/2011 | | |
| WO | WO 2011016495 A1 * | 2/2011 | ....... | B32B 17/10761 |
| WO | WO 2012043273 A1 * | 4/2012 | ............ | C09D 11/00 |
| WO | WO 2014188542 A1 * | 11/2014 | ............ | B32B 27/22 |
| WO | WO 2014188543 A1 * | 11/2014 | ............ | B32B 27/22 |

* cited by examiner

POLYVINYL ACETAL COMPOSITION

TECHNICAL FIELD

The present invention relates to a composition including a polyvinyl acetal, a sheet made from the composition, and an application thereof.

BACKGROUND ART

A polyvinyl acetal represented by polyvinyl butyral has excellent adhesion and compatibility with various organic and inorganic substrates, and has excellent solubility in an organic solvent. The polyvinyl acetal is widely used as various adhesives, a binder for ceramics, various inks, paints, and the like, or an interlayer film for safety glass.

Recently, in an application of an interlayer film for laminated glass, various highly functional products have been developed. For example, a laminated sound insulation interlayer film for laminated glass is disclosed (for example, refer to Patent Literatures 1 and 2). In the laminated sound insulation interlayer film for laminated glass, in order to impart high sound insulating properties to the interlayer film for laminated glass, a plurality of polyvinyl acetal layers having different compositions is laminated. For example, the polyvinyl acetal layers have different content ratios of a polyvinyl acetal and a plasticizer. In the interlayer film for laminated glass, in general, in order to make amounts of a plasticizer included in the respective layers different from each other, polyvinyl acetals having different average amounts of remaining hydroxyl groups between the respective layers are used.

In the interlayer film for laminated glass made from a composition including a polyvinyl acetal and a plasticizer, in addition to mechanical strength and adhesion to glass, required for an interlayer film for laminated glass, water resistance such as low water absorbency is required. Triethylene glycol di(2-ethylhexanoate) has low polarity and a high boiling point. A composition obtained by mixing triethylene glycol di(2-ethylhexanoate) with a polyvinyl acetal, and a sheet made from the composition exhibit, in a well-balanced manner, properties required for an interlayer film for laminated glass, such as mechanical strength, adhesion to glass, and water resistance. Therefore, triethylene glycol di(2-ethylhexanoate) is used particularly often as a plasticizer in this field (for example, refer to Patent Literature 3).

By the way, in general, an interlayer film for laminated glass is manufactured by extrusion molding from a viewpoint of production costs thereof. The laminated sound insulation interlayer film for laminated glass is manufactured by a coextrusion method. However, when the interlayer film for laminated glass is manufactured by this method, a trim or an off-spec product which cannot be a commercial product because of nonuniform composition or thickness is generated in a certain amount.

In general, such a trim or an off-spec product can be recycled by melt kneading and extrusion molding again. However, when a mixture of polyvinyl acetal compositions having different compositions as a trim or an off-spec product is used, a resulting interlayer film for laminated glass may be opaque. In particular, in the laminated sound insulation interlayer film for laminated glass, the polyvinyl acetal compositions included in the respective layers include polyvinyl acetals having different average amounts of remaining hydroxyl groups from each other. Therefore, it is difficult to make the polyvinyl acetals compatible with each other. The interlayer film for laminated glass obtained by recycling the trim or the off-spec product generated during manufacturing the laminated sound insulation interlayer film for laminated glass has a problem of poor transparency. When the polyvinyl acetal composition includes triethylene glycol di(2-ethylhexanoate) as a plasticizer, there is a significant problem that the interlayer film for laminated glass obtained by recycling the trim or the off-spec product has poor transparency.

CITATION LIST

Patent Literature

Patent Literature 1: JP 2011-225449 A
Patent Literature 2: JP 2011-084468 A
Patent Literature 3: WO 2000/018698 A

SUMMARY OF INVENTION

Technical Problem

An object of the present invention is to provide a polyvinyl acetal composition from which a sheet having excellent transparency can be molded even when a trim or an off-spec product of a laminated sound insulation interlayer film for laminated glass, which has been difficult to recycle as a transparent sheet, is used as a raw material in a case where the polyvinyl acetal composition includes polyvinyl acetals having different average amounts of remaining hydroxyl groups.

Solution to Problem

According to the present invention, the above-described object can be suitably achieved by providing a polyvinyl acetal composition comprising 3 to 100 parts by mass of polyvinyl acetal (B) with respect to 100 parts by mass of polyvinyl acetal (A), and 0.05 to 0.75 times by mass of compound (C) with respect to the total mass of polyvinyl acetal (A) and polyvinyl acetal (B). The polyvinyl acetal (A) has an average amount of remaining hydroxyl groups of X mol % (X is a positive number), the polyvinyl acetal (B) has an average amount of remaining hydroxyl groups of Y mol % (Y is a positive number), and $|X-Y| \geq 3$ is satisfied. The compound (C) is selected from a group consisting of a polyester containing a hydroxyl group, a polyalkylene oxide, and an ester compound containing a hydroxyl group. The ester compound containing a hydroxyl group is an ester compound of one molecule of an m-valent alcohol (m represents an integer of 1 to 3) and n molecules (n represents an integer of 1 to m) of a monovalent carboxylic acid.

In the polyvinyl acetal composition of the present invention, preferably, X is 20 to 40 and/or Y is 15 to 45, more preferably, at least one of X and Y is 33 or less, and still more preferably, both of X and Y are 33 or less.

An average amount of remaining hydroxyl groups of all the polyvinyl acetals included in the polyvinyl acetal composition of the present invention is preferably 19 to 33 mol %.

Compound (C) is preferably a polyester containing a hydroxyl group.

The polyester containing a hydroxyl group is preferably a condensation polymer (C-1) of a polyvalent carboxylic acid and a polyhydric alcohol.

The polyester containing a hydroxyl group is preferably a polymer (C-2) of a hydroxycarboxylic acid or a lactone compound.

The polyester containing a hydroxyl group is preferably a polycarbonate polyol (C-3).

Compound (C) is preferably a polyalkylene oxide.

Compound (C) is preferably an ester compound containing a hydroxyl group, which is an ester compound of one molecule of an m-valent alcohol (m represents an integer of 1 to 3) and n molecules (n represents an integer of 1 to m) of a monovalent carboxylic acid.

The monovalent carboxylic acid preferably includes ricinoleic acid.

The ester compound containing a hydroxyl group is preferably castor oil.

Compound (C) preferably contains 1 to 4 hydroxyl groups.

A number average molecular weight of the compound (C) obtained on the basis of hydroxyl value is preferably 200 to 2000.

Compound (C) preferably has a hydroxyl value of 50 to 600 mgKOH/g.

Furthermore, the polyvinyl acetal composition of the present invention preferably includes 0.05 to 0.55 times by mass of an ester compound of an alcohol and a carboxylic acid, containing no hydroxyl group, with respect to the total mass of polyvinyl acetal (A) and polyvinyl acetal (B), and the total of a content of the compound containing no hydroxyl group and a content of compound (C) is preferably 0.3 to 0.6 times by mass the total mass of polyvinyl acetal (A) and polyvinyl acetal (B). In this case, the ester compound of an alcohol and a carboxylic acid, containing no hydroxyl group, is preferably triethylene glycol di(2-ethylhexanoate).

In the polyvinyl acetal composition of the present invention, polyvinyl acetal (A) is preferably obtained by acetalizing a polyvinyl alcohol having a viscosity average polymerization degree of 1000 to 2500.

Furthermore, the present invention relates to a sheet made from the polyvinyl acetal composition and laminated glass including the sheet.

Advantageous Effects of Invention

According to the polyvinyl acetal composition of the present invention, a sheet having excellent transparency is obtained even when the polyvinyl acetal composition includes polyvinyl acetal (A) and polyvinyl acetal (B) having different average amounts of remaining hydroxyl groups.

DESCRIPTION OF EMBODIMENTS

Examples of compound (C) used in the present invention include a polyester containing a hydroxyl group, a polyalkylene oxide, and an ester compound containing a hydroxyl group (hereinafter, simply referred to as an ester compound containing a hydroxyl group), the ester compound containing a hydroxyl group being an ester compound of one molecule of an m-valent alcohol (m represents an integer of 1 to 3) and n molecules (n represents an integer of 1 to m) of a monovalent carboxylic acid.

Preferable examples of the polyester containing a hydroxyl group used in the present invention include polyester (C-1) which is a condensation polymer of a polyhydric alcohol and a polyvalent carboxylic acid and contains a hydroxyl group (hereinafter, simply referred to as polyester (C-1)), polyester (C-2) which is a polymer of a hydroxycarboxylic acid or a lactone compound and contains a hydroxyl group (hereinafter, simply referred to as polyester (C-2)), and a polycarbonate polyol (C-3) containing a hydroxyl group (hereinafter, simply referred to as polyester (C-3)). Hereinafter, these will be described in order.

Polyester (C-1) is obtained by condensation polymerization of a polyvalent carboxylic acid and a polyhydric alcohol while the polyhydric alcohol exists in an excessive amount. Examples of the polyvalent carboxylic acid include an aliphatic divalent carboxylic acid such as succinic acid, glutaric acid, adipic acid, suberic acid, sebacic acid, dodecanedioic acid, or 1,2-cyclohexanedicarboxylic acid; an aliphatic trivalent carboxylic acid such as 1,2,3-propane tricarboxylic acid or 1,3,5-pentatricarboxylic acid; an aromatic divalent carboxylic acid such as phthalic acid or terephthalic acid; and an aromatic trivalent carboxylic acid such as trimellitic acid. However, the polyvalent carboxylic acid is not limited thereto. Among these, the aliphatic divalent carboxylic acid, particularly an aliphatic divalent carboxylic acid having 6 to 10 carbon atoms is preferable because heat resistance of a resulting polyester, compatibility thereof with the polyvinyl acetal, and a plasticizing effect thereof on the polyvinyl acetal are excellent. Examples of the polyhydric alcohol include an aliphatic dihydric alcohol such as ethylene glycol, 1,2-propanediol, 1,3-propanediol, 1,2-butanediol, 1,3-butanediol, 1,4-butanediol, 1,2-hexanediol, 3-methyl-1,5-pentanediol, 1,2-octanediol, 1,2-nonanediol, 1,8-nonanediol, 1,9-nonanediol, 1,2-cyclohexanediol, 1,2-cyclohexanedimethanol, 1,4-cyclohexanedimethanol, diethylene glycol, or triethylene glycol; an aliphatic trihydric alcohol such as glycerin; and an aliphatic tetrahydric alcohol such as erythritol or pentaerythritol. However, the polyhydric alcohol is not limited thereto. Among these, the aliphatic dihydric alcohol is preferable because the aliphatic dihydric alcohol has excellent weather resistance of polyester (C-1), excellent compatibility with the polyvinyl acetal, and an excellent plasticizing effect on the polyvinyl acetal.

Polyester (C-1) can be manufactured by a conventionally known method. For example, a polyvalent carboxylic acid and a polyhydric alcohol are dissolved in an appropriate solvent as necessary, and an appropriate amount of a catalyst is added thereto to perform a condensation polymerization reaction. Examples of the catalyst include an inorganic acid such as hydrochloric acid, sulfuric acid, nitric acid, or phosphoric acid; an organic acid such as trifluoroacetic acid or p-toluenesulfonic acid; a Lewis acid such as a titanium compound such as titanic acid, tetraalkoxy titanium, or titanium tetracarboxylate, or a tin compound; an inorganic base such as sodium hydroxide or potassium hydroxide; and an organic base such as triethylamine, pyridine, 1,8-diazabicyclo[5.4.0]-7-undecene, or sodium acetate. Water generated during the reaction may be distilled off, or the reaction temperature may be changed appropriately. Polyester (C-1) is obtained by deactivating the catalyst after the reaction. A molar ratio between the polyvalent carboxylic acid and the polyhydric alcohol is usually preferably 100/100.5 to 100/130, more preferably 100/101 to 100/115.

Polyester (C-2) is obtained by condensation polymerization of a hydroxycarboxylic acid. Examples of the hydroxycarboxylic acid include glycolic acid, lactic acid, 2-hydroxybutanoic acid, 3-hydroxybutanoic acid, 4-hydroxybutanoic acid, 6-hydroxy hexanoic acid, and ricinoleic acid. A lactone compound obtained by intramolecular condensation of such a hydroxycarboxylic acid can be also used as a raw material. Examples of the lactone compound include β-butyrolactone, δ-valerolactone, ε-caprolactone, and 4-methyl-δ-valerolactone. However, the lactone compound is not limited thereto. When the lactone compound is used, it is possible to obtain polyester (C-2) by ring-opening polymerization. Among these, 6-hydroxy hexanoic acid or ε-caprolactone is preferable from viewpoints of heat resistance of polyester (C-2), compatibility with the polyvinyl acetal, and a plasticizing effect thereon.

In addition to the hydroxycarboxylic acid and the lactone compound, a monohydric alcohol or a polyhydric alcohol can be used as a raw material of polyester (C-2). Examples of the monohydric alcohol include methanol, ethanol, butanol, isobutanol, hexanol, 2-ethyl-1-butanol, and 2-ethyl-1-hexanol. Examples of the polyhydric alcohol include the polyhydric alcohols exemplified as a raw material of the polyester which is an alternating copolymer of a polyvalent carboxylic acid and a polyhydric alcohol and contains a hydroxyl group.

Polyester (C-2) can be manufactured by a conventionally known method. That is, a hydroxycarboxylic acid, a lactone compound, or in some cases, a monohydric alcohol or a polyhydric alcohol is dissolved in an appropriate solvent as necessary. An appropriate amount of a catalyst is added thereto to perform a reaction. Examples of the catalyst include an inorganic acid such as hydrochloric acid, sulfuric acid, nitric acid, or phosphoric acid; an organic acid such as trifluoroacetic acid or p-toluenesulfonic acid; a Lewis acid such as a titanium compound such as titanic acid, tetraalkoxy titanium, or titanium tetracarboxylate, or a tin compound; an inorganic base such as sodium hydroxide or potassium hydroxide; and an organic base such as triethylamine, pyridine, 1,8-diazabicyclo[5.4.0]-7-undecene, or sodium acetate. Water generated during the reaction may be distilled off, or the reaction temperature may be changed appropriately. Polyester (C-2) is obtained by deactivating the catalyst after the reaction.

Polyester (C-3) is obtained by condensation polymerization of a polyhydric alcohol and a carbonate compound while the polyhydric alcohol exists in an excessive amount. Examples of the polyhydric alcohol include the polyhydric alcohols exemplified as a raw material of polyester (C-3). Examples of the carbonate compound include ethylene carbonate, diethyl carbonate, and diphenyl carbonate.

Polyester (C-3) can be manufactured by a conventionally known method. That is, a polyhydric alcohol and a carbonate compound are dissolved in an appropriate solvent as necessary, and an appropriate amount of a catalyst is added thereto to perform a condensation polymerization reaction. Examples of the catalyst include an inorganic acid such as hydrochloric acid, sulfuric acid, nitric acid, or phosphoric acid; an organic acid such as trifluoroacetic acid or p-toluenesulfonic acid; a Lewis acid such as a titanium compound such as titanic acid, tetraalkoxy titanium, or titanium tetracarboxylate, or a tin compound; an inorganic base such as sodium hydroxide or potassium hydroxide; and an organic base such as triethylamine, pyridine, 1,8-diazabicyclo[5.4.0]-7-undecene, or sodium acetate. During the reaction, an alcohol generated by a transesterification reaction between a carbonate compound and a polyhydric alcohol may be distilled off, or the reaction temperature may be changed appropriately. Polyester (C-3) is obtained by deactivating the catalyst after the reaction.

The melting point of the polyester containing a hydroxyl group used in the present invention is preferably 20° C. or lower, more preferably 0° C. or lower, still more preferably lower than −20° C. from a viewpoint of a handling property in manufacturing the polyvinyl acetal composition. The melting point can be measured, for example, using a differential scanning calorimeter (DSC). In order to obtain such a polyester containing a hydroxyl group, a polyvalent carboxylic acid, a polyhydric alcohol, a monohydric alcohol, a hydroxycarboxylic acid, or a lactone compound as a raw material, having a branched structure such as a hydrocarbon group in a side chain, may be selected.

The polyalkylene oxide used in the present invention is preferably a compound obtained by ring-opening addition polymerization of an alkylene oxide using an alcohol or a carboxylic acid as a starting terminal.

The alkylene oxide preferably has 2 to 20 carbon atoms, more preferably 3 to 10 carbon atoms, still more preferably 3 to 6 carbon atoms, and is particularly preferably propylene oxide, from viewpoints of availability and compatibility of the resulting polyalkylene oxide with the polyvinyl acetal. Examples thereof include ethylene oxide, propylene oxide, 1,2-butylene oxide, isobutylene oxide, 2,3-butylene oxide, 2-propyloxirane, 2,2,3-trimethyloxirane, 2-isopropyloxirane, 2-ethyl-2-methyloxirane, 2-ethyl-3-methyloxirane, cyclopentene oxide, cyclohexene oxide, 2,2-dimethyl-3-ethyloxirane, 2-butyloxirane, 2-methyl-2-propyloxirane, 2,3-epoxy-4-methylpentane, 2,2,3,3-tetramethyloxirane, 2,3-diethyloxirane, (2-methylpropyl)oxirane, 2-tert-butyloxirane, 2-methyl-2-(1-methylethyl)oxirane, 2,2-diethyloxirane, 2,3-epoxyhexane, (1-methyl-propyl)oxirane, 2-ethyl-2,3-dimethyloxirane, 2-pentyloxirane, 2-(2,2-dimethylpropyl)oxirane, 2-butyl-3-methyloxirane, 2-methyl-2-(1-methylpropyl)oxirane, 2-methyl-2-isobutyloxirane, 2-ethyl-3-propyloxirane, (3-methylbutyl)oxirane, (2-methylbutyl)oxirane, 2-tert-butyl-3-methyloxirane, 2,3-epoxy-2-methylhexane, 1-methylbutyloxirane, 8-oxabicyclo[5.1.0]octane, 2-hexyloxirane, 2,3-dipropyloxirane, (3,3-dimethylbutyl)oxirane, 2-methyl-2-pentyloxirane, 2,3-epoxyoctane, 1,2-epoxy-2,4,4-trimethylpentane, 2-butyl-3-ethyloxirane, 2,2-dimethyl-3-butyloxirane, 2,2-dimethyl-3-tert-butyloxirane, 2,2,3-trimethyl-3-isopropyloxirane, 2,3-diisopropyloxirane, 2-heptyloxirane, 2-butyl-3-propyloxirane, 2-octyloxirane, 2,3-dibutyloxirane, and 2-pentyl-3-propyloxirane.

Examples of the alcohol include a monohydric alcohol such as methanol, ethanol, butanol, hexanol, 2-ethyl-1-hexanol, or phenol, a dihydric alcohol such as ethylene glycol, 1,2-propylene glycol, 1,3-propylene glycol, 1,3-butanediol, 3-methyl-1,5-pentanediol, diethylene glycol, or triethylene glycol, and a trihydric alcohol such as glycerin. Examples of the carboxylic acid include a monovalent carboxylic acid such as acetic acid, propionic acid, butanoic acid, hexanoic acid, or 2-ethylhexanoic acid, and a divalent carboxylic acid such as adipic acid or sebacic acid. An alcohol such as a monohydric alcohol, a dihydric alcohol, or a trihydric alcohol used as a starting terminal is preferable because of excellent hydrolysis resistance. Among these, 1,2-propylene glycol, 2-ethyl-1-hexanol, triethylene glycol, or glycerin is preferable from viewpoints of availability at low cost and a plasticizing effect of the resulting polyalkylene oxide on the polyvinyl acetal. A carboxylic acid such as a monovalent carboxylic acid or a divalent carboxylic acid used as a starting terminal is preferable from a viewpoint of oxidation resistance. Among these, 2-ethylhexanoic acid is preferable from viewpoints of low cost and excellent hydrolysis resistance.

The polyalkylene oxide can be manufactured by a conventionally known method. That is, an alcohol or a carboxylic acid is dissolved in an appropriate solvent as necessary, and an appropriate amount of a catalyst and an alkylene oxide are added thereto to perform a reaction.

A content of an alkylene oxide unit included in the polyalkylene oxide is not particularly limited. However, the content of the alkylene oxide unit is preferably 30% by mass or more, more preferably 50% by mass or more, still more preferably 70% by mass or more, with respect to the mass of all the polyalkylene oxides used. In the present invention, for example, in a compound obtained by ring-opening addition polymerization of a propylene oxide to 1,2-propylene glycol, it is assumed that a ratio of a part obtained by ring-opening addition polymerization of the propylene oxide is 100% by mass. When the content of the alkylene oxide unit is less than 30% by mass, transparency of a resulting sheet tends to be lowered.

The ester compound containing a hydroxyl group used in the present invention, which is an ester compound of one molecule of an m-valent alcohol (m represents an integer of 1 to 3) and n molecules (n represents an integer of 1 to m) of a monovalent carboxylic acid, will be described.

Examples of the m-valent alcohol included in the ester compound containing a hydroxyl group include an aliphatic alcohol such as a monohydric alcohol (m=1) such as methanol, ethanol, n-butanol, sec-butanol, tert-butanol, 2-ethyl-1-hexanol, or allyl alcohol; a dihydric alcohol (m=2) such as ethylene glycol, 1,2-propanediol, 1,2-butanediol, 1,4-butanediol, 1,2-cyclohexanediol, diethylene glycol, triethylene glycol, or oligoethylene glycol; or a trihydric alcohol (m=3) such as glycerin, and an aromatic alcohol such as phenol. However, the m-valent alcohol is not limited thereto. Among these, an aliphatic alcohol, particularly an aliphatic alcohol not containing a carbon-carbon double bond, is preferable from viewpoints of easy availability and excellent weather resistance. The carbon number of the m-valent alcohol is preferably 6 to 18, more preferably 8 to 18 from a viewpoint of obtaining an ester compound containing a hydroxyl group and having a high boiling point. A dihydric alcohol or a trihydric alcohol is preferable, and a trihydric alcohol is more preferable, in terms of a valence of an alcohol.

Examples of the monovalent carboxylic acid include a monovalent carboxylic acid containing no hydroxyl group, such as acetic acid, butanoic acid, hexanoic acid, 2-ethylbutanoic acid, octanoic acid, 2-ethylhexanoic acid, palmitic acid, stearic acid, oleic acid, linoleic acid, or linolenic acid; and a monovalent carboxylic acid containing a hydroxyl group, such as glycolic acid, lactic acid, 2-hydroxybutanoic acid, 3-hydroxybutanoic acid, 4-hydroxybutanoic acid, 6-hydroxy hexanoic acid, 12-hydroxystearic acid, or ricinoleic acid. When the monovalent carboxylic acid does not contain a hydroxyl group, n is smaller than m. However, when the monovalent carboxylic acid contains a hydroxyl group, n can be the same as m. The carbon number of the monovalent carboxylic acid is preferably 4 to 20, more preferably 4 to 18. When the carbon number is within the above-described range, compatibility with the polyvinyl acetal and a plasticizing effect on the polyvinyl acetal tend to be excellent. Among these, a carboxylic acid not containing a carbon-carbon double bond, such as 2-ethylhexanoic acid or stearic acid, is preferable from viewpoints of availability at low cost and excellent weather resistance of the resulting polyvinyl acetal composition of the present invention. A carboxylic acid containing a carbon-carbon double bond, such as ricinoleic acid or oleic acid, is preferable from a viewpoint of obtaining an ester compound containing a hydroxyl group, having a low melting point and low viscosity.

Specific examples of the ester compound containing a hydroxyl group, used in the present invention, include methyl ricinoleate, butyl ricinoleate, 2-ethylhexyl ricinoleate, (2-hydroxyethyl)ricinoleate, ricinoleic acid monoglyceride, diricinoleic acid diglyceride, triricinoleic acid triglyceride, glycerin diricinoleic acid ester monooleic acid ester, (2-hydroxyethyl) oleate, (2-hydroxyethyl)2-ethylhexanoate, {2-[2-(2-hydroxyethoxy)ethoxy]ethyl}ricinoleate, {2-[2-(2-hydroxyethoxy)ethoxy]ethyl}2-ethylhexanoate, and castor oil. However, the ester compound containing a hydroxyl group is not limited thereto. Among these, an ester compound containing a hydroxyl group, having ricinoleic acid as at least one of n molecules of monovalent carboxylic acids is preferable, and castor oil is particularly preferable, from viewpoints of availability at low cost, a high boiling point, a low melting point, and excellent water resistance (low water absorbency) of the resulting polyvinyl acetal composition. The castor oil is carboxylic acid triglyceride derived from castor seeds. A ricinoleate occupies a majority of the carboxylic acid ester moieties, generally 80 to 95% by mass thereof. A palmitate, a stearate, an oleate, a linoleate, a linolenate, and the like occupy the remaining part.

Compound (C) used in the present invention preferably contains a hydroxyl group. The number of hydroxyl groups per molecule of compound (C) is not particularly limited, but is preferably four or less, more preferably three or less. When the number of hydroxyl groups per molecule of compound (C) is four or less, compound (C) tends to have excellent compatibility with the polyvinyl acetal.

When the polyalkylene oxide used in the present invention does not contain a hydroxyl group, compatibility with the polyvinyl acetal may be lowered, or transparency of a sheet made from the polyvinyl acetal composition may be lowered. In most cases, the polyalkylene oxide used in the present invention contains a hydroxyl group in either one or both of the terminals. However, the polyalkylene oxide may not contain a hydroxyl group in the terminals. For example, a terminal of the polyalkylene oxide may be treated with an acid or the like to have an ester structure.

A molecular weight of compound (C) used in the present invention is not particularly limited. However, a number average molecular weight based on a hydroxyl value thereof is preferably 200 to 2000, more preferably 220 to 1700, still more preferably 240 to 1500. When the number average molecular weight based on a hydroxyl value is less than 200, the boiling point of compound (C) may not be sufficiently high, and high volatility may become a problem. When the number average molecular weight based on a hydroxyl value is more than 2000, the compatibility between compound (C) and the polyvinyl acetal may be insufficient. The number average molecular weight based on a hydroxyl value is obtained by (the number of hydroxyl groups per molecule of compound (C))/(amount of substance [mol/g] of hydroxyl groups per g of compound (C)=1000×(the number of hydroxyl groups per molecule of compound (C))/((hydroxyl value of compound (C)/56). Here, the number of hydroxyl groups per molecule of compound (C) when two or more kinds of compounds (C) are mixed and used refers to an average value per molecule of compound (C) included in the mixture. The number average molecular weight in the present invention is determined in terms of polystyrene by dissolving an appropriate amount of polypropylene oxide as a sample in tetrahydrofuran (THF) and measuring gel permeation chromatography (GPC).

As compound (C) used in the present invention, any one kind selected from a group consisting of a polyester containing a hydroxyl group, a polyalkylene oxide, and an ester compound containing a hydroxyl group may be used alone, or two or more kinds thereof may be used in combination.

When two or more kinds are used in combination, a content ratio thereof is not particularly limited.

The hydroxyl value of compound (C) used in the present invention is not particularly limited, but is preferably 50 to 600 mgKOH/g, more preferably 70 to 500 mgKOH/g, still more preferably 100 to 400 mgKOH/g, from viewpoints of excellent transparency of the polyvinyl acetal composition, excellent compatibility with the polyvinyl acetal, an excellent plasticizing effect on the polyvinyl acetal, and suppressing bleeding (oozing) of compound (C). When the hydroxyl value is less than 50 mgKOH/g, a sheet obtained from the polyvinyl acetal composition of the present invention may have poor transparency. Meanwhile, when the hydroxyl value is more than 600 mgKOH/g, compatibility between compound (C) and the polyvinyl acetal may be lowered, transparency of a sheet may be lowered, or compound (C) may bleed (ooze) from the sheet. The hydroxyl value here is obtained by measurement by a method described in JIS K1557-1 (2007). When two or more kinds selected from a group consisting of a polyester containing a hydroxyl group, a polyalkylene oxide, and an ester compound containing a hydroxyl group are mixed and used as compound (C), a hydroxyl value thereof refers to a hydroxyl value of the mixture (mixture of compounds (C) having the same mixing ratio as in the polyvinyl acetal composition of the present invention).

A content of compound (C) in the polyvinyl acetal composition of the present invention is 0.05 to 0.75 times by mass, preferably 0.08 to 0.7 times by mass, more preferably 0.1 to 0.6 times by mass, with respect to the total mass of polyvinyl acetal (A) and polyvinyl acetal (B). When the content of compound (C) is less than 0.05 times by mass, transparency of a sheet made from the resulting polyvinyl acetal composition is lowered. On the other hand, when the content of compound (C) is more than 0.75 times by mass, compatibility between the polyvinyl acetal and compound (C) may be lowered.

The polyvinyl acetal composition of the present invention includes 3 to 100 parts by mass of polyvinyl acetal (B), preferably 4 to 70 parts by mass thereof, more preferably 5 to 50 parts by mass thereof, with respect to 100 parts by mass of polyvinyl acetal (A). When the content of polyvinyl acetal (B) is 3 to 100 parts by mass with respect to 100 parts by mass of polyvinyl acetal (A), the effect of the present invention becomes remarkable.

In addition, the polyvinyl acetal composition exhibiting the effect of the present invention is obtained by satisfying $|X-Y| \geq 3$, in which polyvinyl acetal (A) has an average amount of remaining hydroxyl groups of X mol % (X is a positive number), and polyvinyl acetal (B) has an average amount of remaining hydroxyl groups of Y mol % (Y is a positive number). In the present invention, a polyvinyl acetal having a larger content thereof in the polyvinyl acetal composition is referred to as polyvinyl acetal (A), and a smaller content thereof in the polyvinyl acetal composition is referred to as polyvinyl acetal (B). The polyvinyl acetal composition of the present invention may include another polyvinyl acetal than polyvinyl acetal (A) or (B) within a range not damaging the effect of the present invention. In this case, a ratio of polyvinyl acetal (A) occupied in all the polyvinyl acetals is preferably 40% by mass or more, more preferably 45% by mass or more, still more preferably 50% by mass or more.

In the polyvinyl acetal composition of the present invention, X and Y are not particularly limited as long as each of X and Y is a positive number and satisfies $|X-Y| \geq 3$. However, X is preferably 20 to 40, more preferably 23 to 37, still more preferably 25 to 33. Y is preferably 15 to 45, more preferably 17 to 40, still more preferably 19 to 33. X is preferably 33 or less, more preferably 32 or less, still more preferably 31 or less from a viewpoint of excellent low water absorbency (water resistance) of the polyvinyl acetal composition of the present invention. Y is preferably 33 or less, more preferably 32 or less, still more preferably 31 or less. Preferably, at least one of X and Y is 33 or less, and more preferably, both of X and Y are 33 or less, from a viewpoint of improving water resistance of the polyvinyl acetal composition.

$|X-Y|$ in the present invention is 3 or more. However, $|X-Y|$ is preferably 3.5 or more and 15 or less, most preferably 7 or more and 12 or less. When $|X-Y|$ is within the above-described range, the effect of the present invention becomes more remarkable.

An average amount of remaining hydroxyl groups of all the polyvinyl acetals included in the polyvinyl acetal composition of the present invention is not particularly limited, but is preferably 19 to 33 mol %, more preferably 21 to 32 mol %, still more preferably 23 to 31 mol %, from viewpoints of mechanical strength, a handling property, and water resistance. When the average amount of remaining hydroxyl groups is within the above-described range, the polyvinyl acetal composition of the present invention tends to have excellent mechanical strength and water resistance with good balance.

An amount of vinyl ester units in polyvinyl acetal (A) is not particularly limited, but is preferably 0.01 to 2 mol %, more preferably 0.1 to 1.5 mol %. It is difficult to obtain a polyvinyl acetal having an amount of vinyl ester units of less than 0.01 mol % at low cost. When the amount of vinyl ester units included in polyvinyl acetal (A) as a main component of the polyvinyl acetal composition of the present invention is more than 2 mol %, weather resistance of the polyvinyl acetal composition of the present invention may be lowered.

An amount of vinyl ester units in polyvinyl acetal (B) used in the present invention is not particularly limited, but is preferably 0.01 to 20 mol %, more preferably 0.1 to 20 mol %, still more preferably 0.1 to 10 mol %. It is difficult to obtain a polyvinyl acetal having an amount of vinyl ester units of less than 0.01 mol % at low cost. When the amount of vinyl ester units is more than 20 mol %, weather resistance of the polyvinyl acetal composition of the present invention may be lowered.

In the present invention, the average amount of remaining hydroxyl groups and the amount of vinyl ester units of each of polyvinyl acetal (A) and polyvinyl acetal (B), and the average amount of remaining hydroxyl groups of all the polyvinyl acetals can be measured by analyzing polyvinyl acetal (A), polyvinyl acetal (B), and all the polyvinyl acetals in accordance with a conventionally known method such as JIS K6728. The average amount of remaining hydroxyl groups of all the polyvinyl acetals is a value of an amount of remaining hydroxyl groups (vinyl alcohol: mol %) obtained by analyzing all the polyvinyl acetals included in the polyvinyl acetal composition of the present invention (or polyvinyl acetals having the same mixing ratio as in the polyvinyl acetal composition of the present invention) by a conventionally known method such as JIS K6728.

The polyvinyl acetal used in the present invention is usually manufactured using polyvinyl alcohol as a raw material. The polyvinyl alcohol can be obtained by a conventionally known method, that is, by polymerizing a vinyl carboxylate such as vinyl acetate and saponifying the resulting polymer. As a method for polymerizing a carboxylic acid vinyl ester compound, it is possible to use a conventionally known method such as a solution polymerization method, a bulk polymerization method, a suspension polymerization method, or an emulsion polymerization method. As a polymerization initiator, an azo initiator, a peroxide initiator, a redox initiator, or the like can be appropriately selected in accordance with the polymerization method. An alcoholysis or a hydrolysis using a conventionally known alkali catalyst or acid catalyst is applicable to the saponification reaction.

Unless contrary to the gist of the present invention, the polyvinyl alcohol may be obtained by saponifying a copolymer of a vinyl carboxylate compound and another monomer. Examples of the other monomer include an α-olefin such as ethylene, propylene, n-butene, or isobutylene; an acrylate such as methyl acrylate, ethyl acrylate, n-butyl acrylate, i-butyl acrylate, t-butyl acrylate, 2-ethylhexyl acrylate, dodecyl acrylate, or octadecyl acrylate; a methacrylate such as methyl methacrylate, ethyl methacrylate, n-butyl methacrylate, i-butyl methacrylate, t-butyl methacrylate, 2-ethylhexyl methacrylate, dodecyl methacrylate, or octadecyl methacrylate; an acrylamide and a derivative thereof, such as acrylamide, N-methylacrylamide, N-ethylacrylamide, N,N-dimethylacrylamide, diacetone acrylamide, acrylamide propanesulfonic acid and a salt thereof, acrylamide propyl dimethylamine, a salt thereof, and a quaternary salt thereof, or N-methylol acrylamide and a derivative thereof; a methacrylamide and a derivative thereof, such as methacrylamide, N-methyl methacrylamide, N-ethyl methacrylamide, methacrylamide propanesulfonic acid and a salt thereof, methacrylamide propyl dimethylamine, a salt thereof, and a quaternary salt thereof, or N-methylol methacrylamide and a derivative thereof; a vinyl ether such as methyl vinyl ether, ethyl vinyl ether, n-butyl vinyl ether, i-butyl vinyl ether, t-butyl vinyl ether, dodecyl vinyl ether, or stearyl vinyl ether; a nitrile such as acrylonitrile or methacrylonitrile; a vinyl halide such as vinyl chloride or vinyl fluoride; a vinylidene halide such as vinylidene chloride or vinylidene fluoride; an allyl compound such as allyl acetate or allyl chloride; a vinyl silyl compound such as a maleate, maleic anhydride, or vinyltrimethoxysilane; and isopropenyl acetate. However, the monomer is not limited thereto. These other monomers are usually used in amount of less than 10 mol % with respect to a vinyl carboxylate compound when being copolymerized.

A viscosity average polymerization degree of the polyvinyl alcohol as a raw material of the polyvinyl acetal used in the present invention is not particularly limited, is appropriately selected in accordance with the application, but is preferably 150 to 3000, more preferably 200 to 2500. Particularly, the viscosity average polymerization degree of the polyvinyl alcohol used as raw materials of polyvinyl acetal (A) and polyvinyl acetal (B) as main components of the polyvinyl acetal composition of the present invention is preferably 1000 to 2500, more preferably 1500 to 2500, still more preferably 1650 to 2300. When the viscosity average polymerization degree of the polyvinyl alcohol is less than 1000, mechanical strength of a resulting composition may be lowered. When the viscosity average polymerization degree of the polyvinyl alcohol is more than 2500, a handling property of the resulting composition tends to deteriorate.

The polyvinyl acetal used in the present invention can be obtained, for example, by the following method. However, the method is not limited thereto. First, the temperature of a polyvinyl alcohol aqueous solution having a concentration of 3 to 30% by mass is maintained within a range of 80 to 100° C. Thereafter, the temperature is gradually lowered over 10 to 60 minutes. When the temperature is lowered to −10 to 30° C., an aldehyde and an acid catalyst are added. While the temperature is maintained constant, an acetalization reaction is performed for 30 to 300 minutes. Thereafter, the temperature of the reaction solution is raised to 20 to 80° C. over 30 to 200 minutes, and the temperature is maintained for 1 to 6 hours. Subsequently, a neutralizing agent such as an alkali is added as necessary to the reaction solution to neutralize the reaction solution. The resin is washed with water and dried to obtain the polyvinyl acetal used in the present invention.

The acid catalyst used for the acetalization reaction is not particularly limited. Either an organic acid or an inorganic acid can be used. Examples thereof include acetic acid, p-toluenesulfonic acid, nitric acid, sulfuric acid, and hydrochloric acid. Among these, hydrochloric acid, sulfuric acid, or nitric acid is preferably used.

The aldehyde used for the acetalization reaction is not particularly limited. However, an aldehyde having 1 to 8 carbon atoms is preferably used. Examples of the aldehyde having 1 to 8 carbon atoms include formaldehyde, acetaldehyde, propionaldehyde, n-butyraldehyde, isobutyraldehyde, n-hexylaldehyde, 2-ethyl butyraldehyde, n-octylaldehyde, 2-ethylhexyl aldehyde, and benzaldehyde. These aldehydes may be each used alone or may be used in combination of two or more kinds thereof. Among these, an aldehyde having 2 to 5 carbon atoms, particularly an aldehyde having 4 carbon atoms such as n-butyraldehyde or isobutyraldehyde, is preferably used, because of easy availability, easy removal of the aldehyde remaining after the acetalization reaction by washing with water and drying, and an excellent mechanical property of the resulting polyvinyl acetal. That is, both of polyvinyl acetal (A) and polyvinyl acetal (B) used in the present invention are preferably polyvinyl butyral obtained by an acetalization reaction using n-butyraldehyde.

The polyvinyl acetal composition of the present invention may include a conventionally known antioxidant, ultraviolet absorber, and other additives within a range not damaging the effect of the present invention.

When the polyvinyl acetal composition of the present invention is used for an application to be used by appropriately controlling adhesion to glass, such as an interlayer film for laminated glass, an adhesion improver (adhesion control agent) may be added. Examples of the usable adhesion improver include a conventionally known adhesion improver such as an alkali metal salt or an alkaline earth metal salt, such as sodium acetate, potassium acetate, magnesium acetate, or magnesium butyrate. An addition amount thereof is not particularly limited, and can be controlled, for example, such that a Pummel value obtained by a Pummel test is a value corresponding to a purpose.

The polyvinyl acetal composition of the present invention may include a compound known as a plasticizer of a polyvinyl acetal within a range not damaging the effect of the present invention. The polyvinyl acetal composition of the present invention particularly preferably includes a compound containing no hydroxyl group, known as a plasticizer of a polyvinyl acetal, from a viewpoint of improving low water absorbency of the polyvinyl acetal composition of the present invention. As such a compound containing no hydroxyl group, an ester compound of an alcohol and a carboxylic acid, containing no hydroxyl group, is preferable because the ester compound has excellent compatibility with the polyvinyl acetal and an excellent plasticizing effect on the polyvinyl acetal, and the resulting polyvinyl acetal composition of the present invention has low water absorbency.

Examples of the ester compound of an alcohol and a carboxylic acid, containing no hydroxyl group, include triethylene glycol di(2-ethylhexanoate), tetraethylene glycol di(2-ethylhexanoate), di(butoxyethyl)adipate, and di(butoxyethoxyethyl)adipate. Among these, triethylene glycol di(2-ethylhexanoate) is preferable because triethylene glycol di(2-ethylhexanoate) is easily available and has a high boiling point, and the resulting polyvinyl acetal composition has low water absorbency, excellent mechanical strength, and excellent adhesion to glass.

When the polyvinyl acetal composition of the present invention further includes the compound containing no hydroxyl group, a content thereof is not particularly limited, but is preferably 0.05 to 0.55 times by mass, more preferably 0.08 to 0.46 times by mass, still more preferably 0.1 to 0.44 times by mass, with respect to the total mass of polyvinyl acetal (A) and polyvinyl acetal (B). When the content of the compound containing no hydroxyl group is less than 0.05 times by mass with respect to the total mass of polyvinyl acetal (A) and polyvinyl acetal (B), an effect of imparting flexibility to the composition of the present invention may be insufficient. When the content of the compound containing no hydroxyl group is more than 0.55 times by mass, the compound containing no hydroxyl group may undesirably bleed (ooze) from the composition of the present invention.

Particularly when the polyvinyl acetal composition of the present invention is molded into a sheet to be used as an interlayer film for laminated glass, a total mass of a content of compound (C) and a content of the compound containing no hydroxyl group is preferably 0.3 to 0.6 times by mass, more preferably 0.32 to 0.55 times by mass, still more preferably 0.33 to 0.52 times by mass, with respect to the total mass of polyvinyl acetal (A) and polyvinyl acetal (B). When the total mass of compound (C) and the compound containing no hydroxyl group is less than 0.3 times by mass with respect to the total mass of polyvinyl acetal (A) and polyvinyl acetal (B), the resulting polyvinyl acetal composition may have poor flexibility. When the total mass is more than 0.6 times by mass, sufficient mechanical strength may not be obtained. When the polyvinyl acetal composition of the present invention is used as an interlayer film for laminated glass, temperature (peak temperature of tan δ) at which tan δ determined by a dynamic viscoelasticity measurement (refer to Examples described later) is maximized is usually preferably 60° C. or lower, more preferably 50° C. or lower, still more preferably 40° C. or lower.

The polyvinyl acetal composition of the present invention is obtained by mixing polyvinyl acetal (A), polyvinyl acetal (B), compound (C), and as necessary, the compound containing no hydroxyl group and an additive, in predetermined amounts, by a conventionally known method. Examples of the mixing method include melt kneading using a mixing roll, a plastomill, an extruder, or the like, and a method in which the components are dissolved in an organic solvent and the solvent is then distilled off. However, the mixing method is not limited thereto.

A sheet obtained by molding (for example, extrusion molding or press molding) the polyvinyl acetal composition of the present invention has excellent transparency, and is suitably used particularly for an interlayer film for laminated glass.

The thickness of the sheet is not particularly limited, but is usually preferably 0.01 to 5 mm, more preferably 0.05 to 3 mm, still more preferably 0.1 to 1.6 mm.

When the sheet of the present invention is used as an interlayer film for laminated glass, glass to be laminated with the sheet of the present invention is not particularly limited. Examples thereof include inorganic glass such as float plate glass, polished plate glass, template glass, wire-reinforced plate glass, or heat-absorbing plate glass, and conventionally known organic glass such as polymethyl methacrylate or polycarbonate. These glass can be used without limitation. These glass may be colorless or colored, and may be transparent or non-transparent. These glass may be each used alone or may be used in combination of two or more kinds thereof. The thickness of the glass is not particularly limited, but, in general, is preferably 100 mm or less.

When the sheet of the present invention is used as an interlayer film for laminated glass, the shape of the surface of the sheet is not particularly limited. However, a sheet having an uneven structure is preferable because a foam removing property is excellent when the sheet and glass are thermally pressure-bonded.

Laminated glass obtained by using the sheet of the present invention is also included in the present invention. The laminated glass can be manufactured by a conventionally known method. Examples thereof include a method using a vacuum laminator, a method using a vacuum bag, a method using a vacuum ring, a method using a nip roll, and the like. Other examples thereof include a method in which real bonding is performed by introducing the sheet and the glass into an autoclave after the sheet and the glass are temporarily pressure-bonded by the above-described method.

When the sheet of the present invention is used as an interlayer film for laminated glass, a sheet made by using a polyvinyl acetal composition to which an inorganic particle having poor dispersibility is not added or added in a such a small amount as not to deteriorate transparency, is extremely preferable, from a viewpoint of exhibiting the characteristics of the present invention to the maximum extent. Haze of the laminated glass of the present invention, obtained by using such a sheet, is preferably 0.1 to 3%, more preferably 0.1 to 1.5%, still more preferably 0.1 to 1%. In order to achieve a haze value within such a range, the haze of the glass to be laminated with the sheet of the present invention is also extremely preferably within the range.

EXAMPLES

Hereinafter, the present invention will be described in more detail using Examples or the like. However, the present invention is not limited in any way by Examples.

Manufacturing Example 1

A five liter glass container equipped with a reflux condenser, a thermometer, and an anchor type stirring blade was charged with 3600 g of ion-exchanged water and 400 g of polyvinyl alcohol (PVA-1: viscosity average polymerization degree: 1700, saponification degree: 99 mol %). The temperature was raised to 95° C., and polyvinyl alcohol was completely dissolved. While the resulting solution was stirred at 120 rpm, the temperature thereof was gradually lowered to 10° C. over about 30 minutes. Thereafter, 230 g of butyraldehyde and 200 mL of a 20% by mass hydrochloric acid aqueous solution were added thereto, and a butyralization reaction was performed for 50 minutes. Thereafter, the temperature was raised to 65° C. over 60 minutes, was maintained at 65° C. for 120 minutes, and was lowered to room temperature. After a resulting resin was washed with ion-exchanged water, a sodium hydroxide aqueous solution was added thereto to neutralize a remaining acid. The resin was further washed with excessive water, and dried to obtain polyvinyl butyral (PVB-1). When the resulting PVB-1 was analyzed in accordance with JIS K6728, an average butyralization degree (average acetalization degree) was 69.0 mol %, a content of vinyl ester units was 1.0 mol %, and an average amount of remaining hydroxyl groups was 30.0 mol % (refer to Table 1).

Manufacturing Example 2

PVB-2 was obtained in a similar manner to Manufacturing Example 1 except that the use amount of butyraldehyde was changed to 250 g and the use amount of the 20% by mass hydrochloric acid aqueous solution was changed to 280 mL. When the resulting PVB-2 was analyzed in accordance with JIS K6728, the average butyralization degree (average acetalization degree) was 75.8 mol %, the content of vinyl ester units was 1.0 mol %, and the average amount of remaining hydroxyl groups was 23.2 mol % (refer to Table 1).

Manufacturing Example 3

PVB-3 was obtained in a similar manner to Manufacturing Example 1 except that the use amount of butyraldehyde was changed to 206 g. When PVB-3 was analyzed in accordance with JIS K6728, the average butyralization degree (average acetalization degree) was 61.7 mol %, the content of vinyl ester units was 0.9 mol %, and the average amount of remaining hydroxyl groups was 37.4 mol % (refer to Table 1).

Manufacturing Example 4

PVB-4 was obtained in a similar manner to Manufacturing Example 1 except that 400 g of PVA-2 (viscosity average polymerization degree: 1700, saponification degree: 87 mol %) was used in place of PVA-1, and the use amount of butyraldehyde was changed to 258 g. When PVB-4 was analyzed in accordance with JIS K6728, the average butyralization degree (average acetalization degree) was 73.8 mol %, the content of vinyl ester units was 6.8 mol %, and the average amount of remaining hydroxyl groups was 19.4 mol % (refer to Table 1).

Manufacturing Example 5

PVB-5 was obtained in a similar manner to Manufacturing Example 1 except that 400 g of PVA-3 (viscosity average polymerization degree: 1700, saponification degree: 91 mol %) was used in place of PVA-1, and the use amount of butyraldehyde was changed to 230 g. When PVB-5 was analyzed in accordance with JIS K6728, the average butyralization degree (average acetalization degree) was 66.8 mol %, the content of vinyl ester units was 8.4 mol %, and the average amount of remaining hydroxyl groups was 24.8 mol % (refer to Table 1).

Manufacturing Example 6

PVB-6 was obtained in a similar manner to Manufacturing Example 1 except that 400 g of PVA-4 (viscosity average polymerization degree: 1700, saponification degree: 90 mol %) was used in place of PVA-1, and the use amount of butyraldehyde was changed to 238 g. When PVB-6 was analyzed in accordance with JIS K6728, the average butyralization degree (average acetalization degree) was 70.3 mol %, the content of vinyl ester units was 9.0 mol %, and the average amount of remaining hydroxyl groups was 20.7 mol % (refer to Table 1).

Manufacturing Example 7

PVB-7 was obtained in a similar manner to Manufacturing Example 1 except that the use amount of butyraldehyde was changed to 212 g. When PVB-7 was analyzed in accordance with JIS K6728, the average butyralization degree (average acetalization degree) was 65.2 mol %, the content of vinyl ester units was 0.8 mol %, and the average amount of remaining hydroxyl groups was 34.0 mol % (refer to Table 1).

Manufacturing Example 8

PVB-8 was obtained in a similar manner to Manufacturing Example 6 except that the use amount of butyraldehyde was changed to 270 g. When PVB-8 was analyzed in accordance with JIS K6728, the average butyralization degree (average acetalization degree) was 73.9 mol %, the content of vinyl ester units was 9.1 mol %, and the average amount of remaining hydroxyl groups was 17.0 mol % (refer to Table 1).

TABLE 1

|  | polymerization degree[*1] | butyralization degree (mol %) | amount of vinyl ester units (mol %) | average amount of remaining hydroxyl groups (mol %) |
| --- | --- | --- | --- | --- |
| PVB - 1 | 1700 | 69.0 | 1.0 | 30.0 |
| PVB - 2 | 1700 | 75.8 | 1.0 | 23.2 |
| PVB - 3 | 1700 | 61.7 | 0.9 | 37.4 |
| PVB - 4 | 1700 | 73.8 | 6.8 | 19.4 |
| PVB - 5 | 1700 | 66.8 | 8.4 | 24.8 |
| PVB - 6 | 1700 | 70.3 | 9.0 | 20.7 |
| PVB - 7 | 1700 | 65.2 | 0.8 | 34.0 |
| PVB - 8 | 1700 | 73.9 | 9.1 | 17.0 |

[*1] viscosity average polymerization degree of polyvinyl alcohol used as a raw material of polyvinyl acetal Example 1

In a beaker, 100 parts by mass of PVB-1, 15 parts by mass of PVB-2, and 40 parts by mass of polyester-1 (PEs-1: polyesterdiol which is a condensation polymer of adipic acid and 3-methyl-1,5-pentanediol, the number of hydroxyl groups per molecule of polyester: 2, number average molecular weight based on a hydroxyl value: 500, average hydroxyl value: 224 mgKOH/g, melting point measured using a differential scanning calorimeter: lower than −20° C.) were stirred and mixed. Thereafter, the resulting mixture was melt kneaded (150° C., 7 minutes) with a labo plastomill to obtain polyvinyl acetal composition-1. The average amount of remaining hydroxyl groups of all the polyvinyl acetals is 29.1 mol %. Composition of the polyvinyl acetal composition is shown in Table 2.

(Evaluation of Water Absorbency of Sheet)

Polyvinyl acetal composition-1 was hot pressed in a mold of 10 cm×10 cm×0.8 mm to obtain sheet-1. When a humidity of sheet-1 was controlled at 25° C. at 60% RH for 24 hours, water absorption rate thereof was 2.0% by mass. The water absorption rate was measured by heating 0.5 g of a sample of sheet-1 after being subjected to humidity control at 200° C. for ten minutes and quantifying a water content vaporized during heating with a Karl Fischer moisture meter manufactured by Mitsubishi Chemical Analytech Co., Ltd. (use in combination of a volumetric method moisture meter KF-200 and a moisture vaporization equipment VA-200). Results are shown in Table 3.

(Evaluation of Cloudiness and Bleeding at the Time of Storage at High Humidity)

Sheet-1 was treated at 23° C. at 90% RH for two weeks. Existence of cloudiness of the treated sheet and existence of bleeding of a component included in sheet-1 were checked. However, none of cloudiness and bleeding were observed. Results are shown in Table 3.

(Dynamic Viscoelasticity)

Sheet-1 was cut with a width of 3 mm, and dynamic viscoelasticity was measured (pulling mode, frequency: 0.3 Hz. The measurement was started from −20° C., and the temperature was raised at 3° C./min. The measurement was terminated when the temperature reached 100° C.). Temperature (peak temperature of tan δ) at which tan δ was maximized within the measurement range was 25° C. Results are shown in Table 3.

(Manufacture of Laminated Glass)

Sheet-1 was temporarily pressure-bonded in a vacuum bag while being sandwiched between two float glass plates of 10 cm×10 cm×3.2 mm (haze: about 0.1%). Thereafter, the laminate was treated in an autoclave at 140° C. at 12 MPa for 40 minutes to obtain laminated glass-1. Haze of the resulting laminated glass-1 was measured and was 0.4%. Results are shown in Table 3.

Example 2

Polyvinyl acetal composition-2, sheet-2, and laminated glass-2 were obtained in a similar manner to Example 1 except that 15 parts by mass of PVB-3 was used in place of PVB-2. The average amount of remaining hydroxyl groups of all the polyvinyl acetals was 31.0 mol %. The resulting sheet-2 and laminated glass-2 were evaluated in a similar manner to Example 1. Composition of the polyvinyl acetal composition is shown in Table 2. Evaluation results of the sheet and the laminated glass are shown in Table 3.

Example 3

Polyvinyl acetal composition-3, sheet-3, and laminated glass-3 were obtained in a similar manner to Example 1 except that 15 parts by mass of PVB-4 was used in place of PVB-2. The average amount of remaining hydroxyl groups of all the polyvinyl acetals was 28.6 mol %. The resulting sheet-3 and laminated glass-3 were evaluated in a similar manner to Example 1. Composition of the polyvinyl acetal composition is shown in Table 2. Evaluation results of the sheet and the laminated glass are shown in Table 3.

Example 4

Polyvinyl acetal composition-4, sheet-4, and laminated glass-4 were obtained in a similar manner to Example 1 except that 5 parts by mass of PVB-4 was used in place of PVB-2, and the use amount of PEs-1 was changed to 39 parts by mass. The average amount of remaining hydroxyl groups of all the polyvinyl acetals was 29.5 mol %. The resulting sheet-4 and laminated glass-4 were evaluated in a similar manner to Example 1. Composition of the polyvinyl acetal composition is shown in Table 2. Evaluation results of the sheet and the laminated glass are shown in Table 3.

Example 5

Polyvinyl acetal composition-5, sheet-5, and laminated glass-5 were obtained in a similar manner to Example 1 except that 40 parts by mass of PVB-4 was used in place of PVB-2, and the use amount of PEs-1 was changed to 50 parts by mass. The average amount of remaining hydroxyl groups of all the polyvinyl acetals was 27.0 mol %. The resulting sheet-5 and laminated glass-5 were evaluated in a similar manner to Example 1. Composition of the polyvinyl acetal composition is shown in Table 2. Evaluation results of the sheet and the laminated glass are shown in Table 3.

Example 6

Polyvinyl acetal composition-6, sheet-6, and laminated glass-6 were obtained in a similar manner to Example 1 except that 80 parts by mass of PVB-4 was used in place of PVB-2, and the use amount of PEs-1 was changed to 60 parts by mass. The average amount of remaining hydroxyl groups of all the polyvinyl acetals was 25.3 mol %. The resulting sheet-6 and laminated glass-6 were evaluated in a similar manner to Example 1. Composition of the polyvinyl acetal composition is shown in Table 2. Evaluation results of the sheet and the laminated glass are shown in Table 3.

Example 7

Polyvinyl acetal composition-7, sheet-7, and laminated glass-7 were obtained in a similar manner to Example 1 except that 15 parts by mass of PVB-5 was used in place of PVB-2. The average amount of remaining hydroxyl groups of all the polyvinyl acetals was 29.3 mol %. The resulting sheet-7 and laminated glass-7 were evaluated in a similar manner to Example 1. Composition of the polyvinyl acetal composition is shown in Table 2. Evaluation results of the sheet and the laminated glass are shown in Table 3.

Example 8

Polyvinyl acetal composition-8, sheet-8, and laminated glass-8 were obtained in a similar manner to Example 1 except that 15 parts by mass of PVB-6 was used in place of PVB-2. The average amount of remaining hydroxyl groups of all the polyvinyl acetals was 28.8 mol %. The resulting sheet-8 and laminated glass-8 were evaluated in a similar manner to Example 1. Composition of the polyvinyl acetal composition is shown in Table 2. Evaluation results of the sheet and the laminated glass are shown in Table 3.

Example 9

Polyvinyl acetal composition-9, sheet-9, and laminated glass-9 were obtained in a similar manner to Example 1 except that 15 parts by mass of PVB-7 was used in place of PVB-2. The average amount of remaining hydroxyl groups of all the polyvinyl acetals was 30.5 mol %. The resulting sheet-9 and laminated glass-9 were evaluated in a similar manner to Example 1. Composition of the polyvinyl acetal composition is shown in Table 2. Evaluation results of the sheet and the laminated glass are shown in Table 3.

Example 10

Polyvinyl acetal composition-10, sheet-10, and laminated glass-10 were obtained in a similar manner to Example 1 except that 15 parts by mass of PVB-8 was used in place of PVB-2. The average amount of remaining hydroxyl groups of all the polyvinyl acetals was 28.3 mol %. The resulting sheet-10 and laminated glass-10 were evaluated in a similar manner to Example 1. Composition of the polyvinyl acetal composition is shown in Table 2. Evaluation results of the sheet and the laminated glass are shown in Table 3.

Example 11

Polyvinyl acetal composition-11, sheet-11, and laminated glass-11 were obtained in a similar manner to Example 3 except that the use amount of PEs-1 was changed to 70 parts by mass. The resulting sheet-11 and laminated glass-11 were evaluated in a similar manner to Example 1. Composition of the polyvinyl acetal composition is shown in Table 2. Evaluation results of the sheet and the laminated glass are shown in Table 3.

Example 12

Polyvinyl acetal composition-12, sheet-12, and laminated glass-12 were obtained in a similar manner to Example 1 except that 100 parts by mass of PVB-7 was used in place of PVB-1, 60 parts by mass of PVB-3 was used in place of PVB-2, and the use amount of PEs-1 was changed to 56 parts by mass. The average amount of remaining hydroxyl groups of all the polyvinyl acetals was 35.3 mol %. The resulting sheet-12 and laminated glass-12 were evaluated in a similar manner to Example 1. Composition of the polyvinyl acetal composition is shown in Table 2. Evaluation results of the sheet and the laminated glass are shown in Table 3.

Example 13

Polyvinyl acetal composition-13, sheet-13, and laminated glass-13 were obtained in a similar manner to Example 3 except that the use amount of PEs-1 was changed to 30 parts by mass. The resulting sheet-13 and laminated glass-13 were evaluated in a similar manner to Example 1. Composition of the polyvinyl acetal composition is shown in Table 2. Evaluation results of the sheet and the laminated glass are shown in Table 3.

Example 14

Polyvinyl acetal composition-14, sheet-14, and laminated glass-14 were obtained in a similar manner to Example 3 except that the use amount of PEs-1 was changed to 11 parts by mass. The resulting sheet-14 and laminated glass-14 were evaluated in a similar manner to Example 1. Composition of the polyvinyl acetal composition is shown in Table 2. Evaluation results of the sheet and the laminated glass are shown in Table 3.

Example 15

Polyvinyl acetal composition-15, sheet-15, and laminated glass-15 were obtained in a similar manner to Example 3 except that the use amount of PEs-1 was changed to 20 parts by mass, and 20 parts by mass of triethylene glycol di(2-ethylhexanoate) (hereinafter, referred to as 3G8) was further added. The resulting sheet-15 and laminated glass-15 were evaluated in a similar manner to Example 1. Composition of the polyvinyl acetal composition is shown in Table 2. Evaluation results of the sheet and the laminated glass are shown in Table 3.

Example 16

Polyvinyl acetal composition-16, sheet-16, and laminated glass-16 were obtained in a similar manner to Example 3 except that the use amount of PEs-1 was changed to 12 parts by mass, and 30 parts by mass of 3G8 was further added. The resulting sheet-16 and laminated glass-16 were evaluated in a similar manner to Example 1. Composition of the polyvinyl acetal composition is shown in Table 2. Evaluation results of the sheet and the laminated glass are shown in Table 3.

Example 17

Polyvinyl acetal composition-17, sheet-17, and laminated glass-17 were obtained in a similar manner to Example 3 except that the use amount of PEs-1 was changed to 8 parts by mass, and 33 parts by mass of 3G8 was further added. The resulting sheet-17 and laminated glass-17 were evaluated in a similar manner to Example 1. Composition of the polyvinyl acetal composition is shown in Table 2. Evaluation results of the sheet and the laminated glass are shown in Table 3.

Example 18

Polyvinyl acetal composition-18, sheet-18, and laminated glass-18 were obtained in a similar manner to Example 3 except that 50 parts by mass of polyester-2 (PEs-2: polyesterdiol which is a condensation polymer of adipic acid and 3-methyl-1,5-pentanediol, the number of hydroxyl groups per molecule of polyester: 2, number average molecular weight based on a hydroxyl value: 920, average hydroxyl value: 122 mgKOH/g, melting point measured using a differential scanning calorimeter: lower than −20° C.) was used in place of PEs-1. The resulting sheet-18 and laminated glass-18 were evaluated in a similar manner to Example 1. Composition of the polyvinyl acetal composition is shown in Table 2. Evaluation results of the sheet and the laminated glass are shown in Table 3.

Example 19

Polyvinyl acetal composition-19, sheet-19, and laminated glass-19 were obtained in a similar manner to Example 3 except that 50 parts by mass of polyester-3 (PEs-3: polyesterdiol which is a condensation polymer of adipic acid and 3-methyl-1,5-pentanediol, the number of hydroxyl groups per molecule of polyester: 2, number average molecular weight based on a hydroxyl value: 1570, average hydroxyl value: 71 mgKOH/g, melting point measured using a differential scanning calorimeter: lower than −20° C.) was used in place of PEs-1. The resulting sheet-19 and laminated glass-19 were evaluated in a similar manner to Example 1. Composition of the polyvinyl acetal composition is shown in Table 2. Evaluation results of the sheet and the laminated glass are shown in Table 3.

Example 20

Polyvinyl acetal composition-20, sheet-20, and laminated glass-20 were obtained in a similar manner to Example 3 except that 45 parts by mass of polyester-4 (PEs-4: polyesterdiol which is a condensation polymer of sebacic acid and 3-methyl-1,5-pentanediol, the number of hydroxyl groups per molecule of polyester: 2, number average molecular weight based on a hydroxyl value: 600, average hydroxyl value: 187 mgKOH/g, melting point measured using a differential scanning calorimeter: lower than −20° C.) was used in place of PEs-1. The resulting sheet-20 and laminated glass-20 were evaluated in a similar manner to Example 1.

Composition of the polyvinyl acetal composition is shown in Table 2. Evaluation results of the sheet and the laminated glass are shown in Table 3.

Example 21

Polyvinyl acetal composition-21, sheet-21, and laminated glass-21 were obtained in a similar manner to Example 3 except that 25 parts by mass of PEs-2 was used in place of PEs-1, and 20 parts by mass of 3G8 was further added. The resulting sheet-21 and laminated glass-21 were evaluated in a similar manner to Example 1. Composition of the polyvinyl acetal composition is shown in Table 2. Evaluation results of the sheet and the laminated glass are shown in Table 3.

Example 22

Polyvinyl acetal composition-22, sheet-22, and laminated glass-22 were obtained in a similar manner to Example 3 except that 45 parts by mass of polyester-5 (PEs-5: polyesterdiol which is a condensation polymer of adipic acid and 1,9-nonanediol, the number of hydroxyl groups per molecule of polyester: 2, number average molecular weight based on a hydroxyl value: 710, average hydroxyl value: 158 mgKOH/g, melting point measured using a differential scanning calorimeter: lower than −20° C.) was used in place of PEs-1. The resulting sheet-22 and laminated glass-22 were evaluated in a similar manner to Example 1. Composition of the polyvinyl acetal composition is shown in Table 2. Evaluation results of the sheet and the laminated glass are shown in Table 3.

Example 23

Polyvinyl acetal composition-23, sheet-23, and laminated glass-23 were obtained in a similar manner to Example 3 except that 40 parts by mass of polyester-6 (PEs-6: polyesterdiol which is a condensation polymer of a mixture of adipic acid/sebacic acid=1/1 (mass ratio) and 3-methyl-1,5-pentanediol, the number of hydroxyl groups per molecule of polyester: 2, number average molecular weight based on a hydroxyl value: 640, average hydroxyl value: 175 mgKOH/g, melting point measured using a differential scanning calorimeter: lower than 42° C.) was used in place of PEs-1. The resulting sheet-23 and laminated glass-23 were evaluated in a similar manner to Example 1. Composition of the polyvinyl acetal composition is shown in Table 2. Evaluation results of the sheet and the laminated glass are shown in Table 3.

Example 24

Polyvinyl acetal composition-24, sheet-24, and laminated glass-24 were obtained in a similar manner to Example 3 except that 40 parts by mass of polyester-7 (PEs-7: polyesterdiol which is a condensation polymer of a mixture of adipic acid/terephthalic acid=1/1 (mass ratio) and 3-methyl-1,5-pentanediol, the number of hydroxyl groups per molecule of polyester: 2, number average molecular weight based on a hydroxyl value: 500, average hydroxyl value: 224 mgKOH/g, melting point measured using a differential scanning calorimeter: lower than −20° C.) was used in place of PEs-1. The resulting sheet-24 and laminated glass-24 were evaluated in a similar manner to Example 1. Composition of the polyvinyl acetal composition is shown in Table 2. Evaluation results of the sheet and the laminated glass are shown in Table 3.

Example 25

Polyvinyl acetal composition-25, sheet-25, and laminated glass-25 were obtained in a similar manner to Example 3 except that 20 parts by mass of PEs-6 was used in place of PEs-1, and 20 parts by mass of 3G8 was further added. The resulting sheet-25 and laminated glass-25 were evaluated in a similar manner to Example 1. Composition of the polyvinyl acetal composition is shown in Table 2. Evaluation results of the sheet and the laminated glass are shown in Table 3.

TABLE 2

| | polyvinyl acetal (A) (100 parts by mass) | polyvinyl acetal (B) kind | parts by mass | \|X − Y\| (mol %) | average amount of remaining hydroxyl groups of all PVBs (mol %) | polyester containing a hydroxyl group kind | parts by mass | times by mass*2 | compound containing no hydroxyl group kind | parts by mass | times by mass*3 | total mass*4 |
|---|---|---|---|---|---|---|---|---|---|---|---|---|
| Example 1 | PVB-1 | PVB-2 | 15 | 6.8 | 29.1 | PEs-1 | 40 | 0.35 | | | | 0.35 |
| Example 2 | PVB-1 | PVB-3 | 15 | 7.4 | 31.0 | PEs-1 | 40 | 0.35 | | | | 0.35 |
| Example 3 | PVB-1 | PVB-4 | 15 | 10.6 | 28.6 | PEs-1 | 40 | 0.35 | | | | 0.35 |
| Example 4 | PVB-1 | PVB-4 | 5 | 10.6 | 29.5 | PEs-1 | 39 | 0.37 | | | | 0.37 |
| Example 5 | PVB-1 | PVB-4 | 40 | 10.6 | 27.0 | PEs-1 | 50 | 0.36 | | | | 0.36 |
| Example 6 | PVB-1 | PVB-4 | 80 | 10.6 | 25.3 | PEs-1 | 60 | 0.33 | | | | 0.33 |
| Example 7 | PVB-1 | PVB-5 | 15 | 5.2 | 29.3 | PEs-1 | 40 | 0.35 | | | | 0.35 |
| Example 8 | PVB-1 | PVB-6 | 15 | 9.3 | 28.8 | PEs-1 | 40 | 0.35 | | | | 0.35 |
| Example 9 | PVB-1 | PVB-7 | 15 | 4.0 | 30.5 | PEs-1 | 40 | 0.35 | | | | 0.35 |
| Example 10 | PVB-1 | PVB-8 | 15 | 13.0 | 28.3 | PEs-1 | 40 | 0.35 | | | | 0.35 |
| Example 11 | PVB-1 | PVB-4 | 15 | 10.6 | 28.6 | PEs-1 | 70 | 0.61 | | | | 0.61 |
| Example 12 | PVB-7 | PVB-3 | 60 | 3.4 | 35.3 | PEs-1 | 56 | 0.35 | | | | 0.35 |
| Example 13 | PVB-1 | PVB-4 | 15 | 10.6 | 28.6 | PEs-1 | 30 | 0.26 | | | | 0.26 |
| Example 14 | PVB-1 | PVB-4 | 15 | 10.6 | 28.6 | PEs-1 | 11 | 0.10 | | | | 0.10 |
| Example 15 | PVB-1 | PVB-4 | 15 | 10.6 | 28.6 | PEs-1 | 20 | 0.17 | 3G8 | 20 | 0.17 | 0.35 |
| Example 16 | PVB-1 | PVB-4 | 15 | 10.6 | 28.6 | PEs-1 | 12 | 0.10 | 3G8 | 30 | 0.26 | 0.37 |
| Example 17 | PVB-1 | PVB-4 | 15 | 10.6 | 28.6 | PEs-1 | 8 | 0.07 | 3G8 | 33 | 0.29 | 0.36 |
| Example 18 | PVB-1 | PVB-4 | 15 | 10.6 | 28.6 | PEs-2 | 50 | 0.43 | | | | 0.43 |
| Example 19 | PVB-1 | PVB-4 | 15 | 10.6 | 28.6 | PEs-3 | 50 | 0.43 | | | | 0.43 |
| Example 20 | PVB-1 | PVB-4 | 15 | 10.6 | 28.6 | PEs-4 | 45 | 0.39 | | | | 0.39 |
| Example 21 | PVB-1 | PVB-4 | 15 | 10.6 | 28.6 | PEs-2 | 25 | 0.22 | 3G8 | 20 | 0.17 | 0.39 |
| Example 22 | PVB-1 | PVB-4 | 15 | 10.6 | 28.6 | PEs-5 | 45 | 0.39 | | | | 0.39 |

TABLE 2-continued

| | polyvinyl acetal (A) (100 parts by mass) | polyvinyl acetal (B) kind | parts by mass | \|X − Y\| (mol %) | average amount of remaining hydroxyl groups of all PVBs (mol %) | polyester containing a hydroxyl group kind | parts by mass | times by mass*2 | compound containing no hydroxyl group kind | parts by mass | times by mass*3 | total mass*4 |
|---|---|---|---|---|---|---|---|---|---|---|---|---|
| Example 23 | PVB-1 | PVB-4 | 15 | 10.6 | 28.6 | PEs-6 | 40 | 0.35 | | | | 0.35 |
| Example 24 | PVB-1 | PVB-4 | 15 | 10.6 | 28.6 | PEs-7 | 40 | 0.35 | | | | 0.35 |
| Example 25 | PVB-1 | PVB-4 | 15 | 10.6 | 28.6 | PEs-6 | 20 | 0.17 | 3G8 | 20 | 0.17 | 0.35 |

*2 multiple of mass of polyester with respect to the total mass of polyvinyl acetal (A) and polyvinyl acetal (B)
*3 multiple of mass of a compound containing no hydroxyl group with respect to the total mass of polyvinyl acetal (A) and polyvinyl acetal (B)
*4 multiple of the total mass of polyester and an ester compound containing no hydroxyl group with respect to the total mass of polyvinyl acetal (A) and polyvinyl acetal (B)

TABLE 3

| | water absorption rate of sheet (% by mass) | cloudiness | bleeding | peak temperature of tanδ (° C.) | haze of laminated glass (%) |
|---|---|---|---|---|---|
| Example 1 | 2.0 | not observed | not observed | 25 | 0.4 |
| Example 2 | 2.3 | not observed | not observed | 27 | 0.4 |
| Example 3 | 2.0 | not observed | not observed | 24 | 0.6 |
| Example 4 | 2.0 | not observed | not observed | 25 | 0.5 |
| Example 5 | 1.9 | not observed | not observed | 24 | 0.5 |
| Example 6 | 1.8 | not observed | not observed | 24 | 0.7 |
| Example 7 | 1.9 | not observed | not observed | 26 | 0.5 |
| Example 8 | 1.7 | not observed | not observed | 26 | 0.8 |
| Example 9 | 2.0 | not observed | not observed | 29 | 0.6 |
| Example 10 | 1.9 | not observed | not observed | 27 | 0.9 |
| Example 11 | 2.5 | not observed | not observed | 20 | 0.4 |
| Example 12 | 2.5 | not observed | not observed | 30 | 0.5 |
| Example 13 | 1.7 | not observed | not observed | 34 | 0.7 |
| Example 14 | 1.3 | not observed | not observed | 46 | 1.0 |
| Example 15 | 1.7 | not observed | not observed | 25 | 0.9 |
| Example 16 | 1.5 | not observed | not observed | 25 | 1.1 |
| Example 17 | 1.4 | slightly observed | not observed | 23 | 1.4 |
| Example 18 | 1.8 | not observed | not observed | 25 | 0.6 |
| Example 19 | 1.6 | not observed | not observed | 27 | 0.7 |
| Example 20 | 1.8 | not observed | not observed | 27 | 0.7 |
| Example 21 | 1.5 | not observed | not observed | 25 | 1.2 |
| Example 22 | 1.8 | not observed | not observed | 26 | 0.6 |
| Example 23 | 1.8 | not observed | not observed | 28 | 0.8 |
| Example 24 | 2.1 | not observed | not observed | 29 | 0.8 |
| Example 25 | 1.5 | not observed | not observed | 27 | 0.9 |

Example 26

Polyvinyl acetal composition-26, sheet-26, and laminated glass-26 were obtained in a similar manner to Example 3 except that 42 parts by mass of polyester-8 (PEs-8: polyesterdiol which is a polymer obtained by addition ring-opening polymerization of ε-caprolactone to 1,2-cyclohexanedimethanol, the number of hydroxyl groups per molecule of polyester: 2, number average molecular weight based on a hydroxyl value: 500, average hydroxyl value: 224 mgKOH/g, melting point measured using a differential scanning calorimeter: 10° C.) was used in place of PEs-1. The resulting sheet-26 and laminated glass-26 were evaluated in a similar manner to Example 1. Composition of the polyvinyl acetal composition is shown in Table 4. Evaluation results of the sheet and the laminated glass are shown in Table 5.

Example 27

Polyvinyl acetal composition-27, sheet-27, and laminated glass-27 were obtained in a similar manner to Example 26 except that the use amount of PEs-8 was changed to 60 parts by mass. The resulting sheet-27 and laminated glass-27 were evaluated in a similar manner to Example 1. Composition of the polyvinyl acetal composition is shown in Table 4. Evaluation results of the sheet and the laminated glass are shown in Table 5.

Example 28

Polyvinyl acetal composition-28, sheet-28, and laminated glass-28 were obtained in a similar manner to Example 26 except that the use amount of PEs-8 was changed to 15 parts by mass. The resulting sheet-28 and laminated glass-28 were evaluated in a similar manner to Example 1. Composition of the polyvinyl acetal composition is shown in Table 4. Evaluation results of the sheet and the laminated glass are shown in Table 5.

Example 29

The resulting sheet-29 and laminated glass-29 were evaluated in a similar manner to Example 1. Polyvinyl acetal composition-29, sheet-29, and laminated glass-29 were obtained in a similar manner to Example 3 except that 48 parts by mass of polyester-9 (PEs-9: polyesterdiol which is a polymer obtained by addition ring-opening polymerization of ε-caprolactone to 1,2-cyclohexanedimethanol, the number of hydroxyl groups per molecule of polyester: 2, number average molecular weight based on a hydroxyl value: 800, average hydroxyl value: 140 mgKOH/g, melting point measured using a differential scanning calorimeter: 18° C.) was used in place of PEs-1. Composition of the polyvinyl acetal composition is shown in Table 4. Evaluation results of the sheet and the laminated glass are shown in Table 5.

Example 30

The resulting sheet-30 and laminated glass-30 were evaluated in a similar manner to Example 1. Polyvinyl acetal composition-30, sheet-30, and laminated glass-30 were obtained in a similar manner to Example 3 except that 42 parts by mass of polyester-10 (PEs-10: polyesterdiol which is a polymer obtained by addition ring-opening polymerization of ε-caprolactone to ethylene glycol, the number of hydroxyl groups per molecule of polyester: 2, number average molecular weight based on a hydroxyl value: 580, average hydroxyl value: 193 mgKOH/g, melting point measured using a differential scanning calorimeter: 13° C.) was used in place of PEs-1. Composition of the polyvinyl acetal composition is shown in Table 4. Evaluation results of the sheet and the laminated glass are shown in Table 5.

Example 31

The resulting sheet-31 and laminated glass-31 were evaluated in a similar manner to Example 1. Polyvinyl acetal composition-31, sheet-31, and laminated glass-31 were obtained in a similar manner to Example 3 except that 40 parts by mass of polyester-11 (PEs-11: polyesterdiol which is a polymer obtained by addition ring-opening polymerization of ε-caprolactone to 2-ethyl-1-hexanol, the number of hydroxyl groups per molecule of polyester: 1, number average molecular weight based on a hydroxyl value: 450, average hydroxyl value: 124 mgKOH/g, melting point measured using a differential scanning calorimeter: 8° C.) was used in place of PEs-1. Composition of the polyvinyl acetal composition is shown in Table 4. Evaluation results of the sheet and the laminated glass are shown in Table 5.

Example 32

The resulting sheet-32 and laminated glass-32 were evaluated in a similar manner to Example 1. Polyvinyl acetal composition-32, sheet-32, and laminated glass-32 were obtained in a similar manner to Example 3 except that 45 parts by mass of polyester-12 (PEs-12: polyesterdiol which is a polymer obtained by addition ring-opening polymerization of ε-caprolactone to glycerin, the number of hydroxyl groups per molecule of polyester: 3, number average molecular weight based on a hydroxyl value: 550, average hydroxyl value: 305 mgKOH/g, melting point measured using a differential scanning calorimeter: 24° C.) was used in place of PEs-1. Composition of the polyvinyl acetal composition is shown in Table 4. Evaluation results of the sheet and the laminated glass are shown in Table 5.

Example 33

Polyvinyl acetal composition-33, sheet-33, and laminated glass-33 were obtained in a similar manner to Example 1 except that 40 parts by mass of PEs-8 was used in place of PEs-1. The resulting sheet-33 and laminated glass-33 were evaluated in a similar manner to Example 1. Composition of the polyvinyl acetal composition is shown in Table 4. Evaluation results of the sheet and the laminated glass are shown in Table 5.

Example 34

Polyvinyl acetal composition-34, sheet-34, and laminated glass-34 were obtained in a similar manner to Example 9 except that 40 parts by mass of PEs-8 was used in place of PEs-1. The resulting sheet-34 and laminated glass-34 were evaluated in a similar manner to Example 1. Composition of the polyvinyl acetal composition is shown in Table 4. Evaluation results of the sheet and the laminated glass are shown in Table 5.

Example 35

Polyvinyl acetal composition-35, sheet-35, and laminated glass-35 were obtained in a similar manner to Example 15 except that 20 parts by mass of PEs-8 was added in place of PEs-1. The resulting sheet-35 and laminated glass-35 were evaluated in a similar manner to Example 1. Composition of the polyvinyl acetal composition is shown in Table 4. Evaluation results of the sheet and the laminated glass are shown in Table 5.

Example 36

Polyvinyl acetal composition-36, sheet-36, and laminated glass-36 were obtained in a similar manner to Example 35 except that the use amount of PEs-8 was changed to 10 parts by mass, and the use amount of 3G8 was changed to 30 parts by mass. The resulting sheet-36 and laminated glass-36 were evaluated in a similar manner to Example 1. Composition of the polyvinyl acetal composition is shown in Table 4. Evaluation results of the sheet and the laminated glass are shown in Table 5.

TABLE 4

| | polyvinyl acetal (A) | polyvinyl acetal (B) | | |X − Y| | average amount of remaining hydroxyl | polyester containing a hydroxyl group | | | compound containing no hydroxyl group | | | |
|---|---|---|---|---|---|---|---|---|---|---|---|
| | (100 parts by mass) | kind | parts by mass | (mol %) | groups of all PVBs (mol %) | kind | parts by mass | times by mass*2 | kind | parts by mass | times by mass*3 | total times by mass*4 |
| Example 26 | PVB-1 | PVB-4 | 15 | 10.6 | 28.6 | PEs-8 | 42 | 0.37 | | | | 0.37 |
| Example 27 | PVB-1 | PVB-4 | 15 | 10.6 | 28.6 | PEs-8 | 60 | 0.52 | | | | 0.52 |
| Example 28 | PVB-1 | PVB-4 | 15 | 10.6 | 28.6 | PEs-8 | 15 | 0.13 | | | | 0.13 |
| Example 29 | PVB-1 | PVB-4 | 15 | 10.6 | 28.6 | PEs-9 | 48 | 0.42 | | | | 0.42 |
| Example 30 | PVB-1 | PVB-4 | 15 | 10.6 | 28.6 | PEs-10 | 42 | 0.37 | | | | 0.37 |
| Example 31 | PVB-1 | PVB-4 | 15 | 10.6 | 28.6 | PEs-11 | 40 | 0.35 | | | | 0.35 |
| Example 32 | PVB-1 | PVB-4 | 15 | 10.6 | 28.6 | PEs-12 | 45 | 0.39 | | | | 0.39 |

TABLE 4-continued

| | polyvinyl acetal (A) (100 parts by mass) | polyvinyl acetal (B) kind | polyvinyl acetal (B) parts by mass | \|X − Y\| (mol %) | average amount of remaining hydroxyl groups of all PVBs (mol %) | polyester containing a hydroxyl group kind | polyester containing a hydroxyl group parts by mass | polyester containing a hydroxyl group times by mass*2 | compound containing no hydroxyl group kind | compound containing no hydroxyl group parts by mass | compound containing no hydroxyl group times by mass*3 | total times by mass*4 |
|---|---|---|---|---|---|---|---|---|---|---|---|---|
| Example 33 | PVB-1 | PVB-2 | 15 | 6.8 | 29.1 | PEs-8 | 40 | 0.35 | | | | 0.35 |
| Example 34 | PVB-1 | PVB-7 | 15 | 4.0 | 30.5 | PEs-8 | 40 | 0.35 | | | | 0.35 |
| Example 35 | PVB-1 | PVB-4 | 15 | 10.6 | 28.6 | PEs-8 | 20 | 0.17 | 3G8 | 20 | 0.17 | 0.35 |
| Example 36 | PVB-1 | PVB-4 | 15 | 10.6 | 28.6 | PEs-8 | 10 | 0.09 | 3G8 | 30 | 0.26 | 0.35 |

*2 multiple of mass of polyester with respect to the total mass of polyvinyl acetal (A) and polyvinyl acetal (B)
*3 multiple of mass of a compound containing no hydroxyl group with respect to the total mass of polyvinyl acetal (A) and polyvinyl acetal (B)
*4 multiple of total mass of polyester and a compound containing no hydroxyl group with respect to the total mass of polyvinyl acetal (A) and polyvinyl acetal (B)

TABLE 5

| | water absorption rate of sheet (% by mass) | cloudiness | bleeding | peak temperature of tanδ (° C.) | haze of laminated glass (%) |
|---|---|---|---|---|---|
| Example 26 | 1.8 | not observed | not observed | 25 | 0.5 |
| Example 27 | 2.2 | not observed | not observed | 20 | 0.5 |
| Example 28 | 1.5 | not observed | not observed | 42 | 1.0 |
| Example 29 | 1.7 | not observed | not observed | 25 | 0.6 |
| Example 30 | 1.7 | not observed | not observed | 27 | 0.5 |
| Example 31 | 1.6 | not observed | not observed | 27 | 0.7 |
| Example 32 | 2.3 | not observed | not observed | 29 | 0.7 |
| Example 33 | 1.8 | not observed | not observed | 26 | 0.5 |
| Example 34 | 2.2 | not observed | not observed | 29 | 0.9 |
| Example 35 | 1.5 | not observed | not observed | 25 | 0.9 |
| Example 36 | 1.4 | slightly observed | not observed | 24 | 1.5 |

Example 37

Polyvinyl acetal composition-37, sheet-37, and laminated glass-37 were obtained in a similar manner to Example 3 except that 42 parts by mass of polyester-13 (PEs-13: polyesterdiol which is a condensation polymer of a mixture of 3-methyl-1,5-pentanediol/1,6-hexanediol=9/1 (mass ratio) and diethyl carbonate, the number of hydroxyl groups per molecule of polyester: 2, number average molecular weight based on a hydroxyl value: 600, average hydroxyl value: 187 mgKOH/g, melting point measured using a differential scanning calorimeter: lower than −20° C.) was used in place of PEs-1. The resulting sheet-37 and laminated glass-37 were evaluated in a similar manner to Example 1. Composition of the polyvinyl acetal composition is shown in Table 6. Evaluation results of the sheet and the laminated glass are shown in Table 7.

Example 38

Polyvinyl acetal composition-38, sheet-38, and laminated glass-38 were obtained in a similar manner to Example 37 except that the use amount of PEs-13 was changed to 60 parts by mass. The resulting sheet-38 and laminated glass-38 were evaluated in a similar manner to Example 1. Composition of the polyvinyl acetal composition is shown in Table 6. Evaluation results of the sheet and the laminated glass are shown in Table 7.

Example 39

Polyvinyl acetal composition-39, sheet-39, and laminated glass-39 were obtained in a similar manner to Example 38 except that the use amount of PEs-13 was changed to 16 parts by mass. The resulting sheet-39 and laminated glass-39 were evaluated in a similar manner to Example 1. Composition of the polyvinyl acetal composition is shown in Table 6. Evaluation results of the sheet and the laminated glass are shown in Table 7.

Example 40

Polyvinyl acetal composition-40, sheet-40, and laminated glass-40 were obtained in a similar manner to Example 3 except that 50 parts by mass of polyester-14 (PEs-14: polyesterdiol which is a copolymer of a mixture of 3-methyl-1,5-pentanediol/1,6-hexanediol=9/1 (mass ratio) and diethyl carbonate, the number of hydroxyl groups per molecule of polyester: 2, number average molecular weight based on a hydroxyl value: 950, average hydroxyl value: 118 mgKOH/g, melting point measured using a differential scanning calorimeter: lower than −20° C.) was used in place of PEs-1. The resulting sheet-40 and laminated glass-40 were evaluated in a similar manner to Example 1. Composition of the polyvinyl acetal composition is shown in Table 6. Evaluation results of the sheet and the laminated glass are shown in Table 7.

Example 41

Polyvinyl acetal composition-41, sheet-41, and laminated glass-41 were obtained in a similar manner to Example 35 except that 20 parts by mass of PEs-13 was used in place of PEs-8. The resulting sheet-41 and laminated glass-41 were evaluated in a similar manner to Example 1. Composition of the polyvinyl acetal composition is shown in Table 6. Evaluation results of the sheet and the laminated glass are shown in Table 7.

Example 42

Polyvinyl acetal composition-42, sheet-42, and laminated glass-42 were obtained in a similar manner to Example 36 except that 10 parts by mass of PEs-13 was used in place of PEs-8. The resulting sheet-42 and laminated glass-42 were evaluated in a similar manner to Example 1. Composition of the polyvinyl acetal composition is shown in Table 6. Evaluation results of the sheet and the laminated glass are shown in Table 7.

glass-3 were obtained in a similar manner to Example 12 except that PEs-1 was not added and 50 parts by mass of 3G8 was added. The resulting Comparative Example sheet-3 and Comparative Example laminated glass-3 were evaluated in a similar manner to Example 1. Composition of the

TABLE 6

|  | polyvinyl acetal (A) | polyvinyl acetal (B) | | average amount of remaining hydroxyl | polyester containing a hydroxyl group | | | compound containing no hydroxyl group | | | |
| --- | --- | --- | --- | --- | --- | --- | --- | --- | --- | --- | --- |
|  | (100 parts by mass) | kind | parts by mass | \|X − Y\| (mol %) | groups of all PVBs (mol %) | kind | parts by mass | times by mass*² | kind | parts by mass | times by mass*³ | total times by mass*⁴ |
| Example 37 | PVB-1 | PVB-4 | 15 | 10.6 | 28.6 | PEs-13 | 42 | 0.37 |  |  |  | 0.37 |
| Example 38 | PVB-1 | PVB-4 | 15 | 10.6 | 28.6 | PEs-13 | 60 | 0.52 |  |  |  | 0.52 |
| Example 39 | PVB-1 | PVB-4 | 15 | 10.6 | 28.6 | PEs-13 | 16 | 0.14 |  |  |  | 0.14 |
| Example 40 | PVB-1 | PVB-4 | 15 | 10.6 | 28.6 | PEs-14 | 50 | 0.43 |  |  |  | 0.43 |
| Example 41 | PVB-1 | PVB-4 | 15 | 10.6 | 28.6 | PEs-13 | 20 | 0.17 | 3G8 | 20 | 0.17 | 0.35 |
| Example 42 | PVB-1 | PVB-4 | 15 | 10.6 | 28.6 | PEs-13 | 10 | 0.09 | 3G8 | 30 | 0.26 | 0.35 |

*²multiple of mass of polyester with respect to the total mass of polyvinyl acetal (A) and polyvinyl acetal (B)
*³multiple of mass of a compound containing no hydroxyl group with respect to the total mass of polyvinyl acetal (A) and polyvinyl acetal (B)
*⁴multiple of total mass of polyester and a compound containing no hydroxyl group with respect the total mass of polyvinyl acetal (A) and polyvinyl acetal (B)

TABLE 7

|  | water absorption rate of sheet (% by mass) | cloudiness | bleeding | peak temperature of tanδ (° C.) | haze of laminated glass (%) |
| --- | --- | --- | --- | --- | --- |
| Example 37 | 1.8 | not observed | not observed | 26 | 0.5 |
| Example 38 | 2.2 | not observed | not observed | 21 | 0.5 |
| Example 39 | 1.6 | not observed | not observed | 45 | 1.0 |
| Example 40 | 1.7 | not observed | not observed | 27 | 0.5 |
| Example 41 | 1.5 | not observed | not observed | 25 | 0.7 |
| Example 42 | 1.4 | slightly observed | not observed | 24 | 1.2 |

Comparative Example 1

Comparative Example composition-1, Comparative Example sheet-1, and Comparative Example laminated glass-1 were obtained in a similar manner to Example 3 except that the addition amount of PEs-1 was changed to 3 parts by mass, and 38 parts by mass of 3G8 was further added. The resulting Comparative Example sheet-1 and Comparative Example laminated glass-1 were evaluated in a similar manner to Example 1. Composition of the polyvinyl acetal composition is shown in Table 8. Evaluation results of the sheet and the laminated glass are shown in Table 9.

Comparative Example 2

Comparative Example composition-2, Comparative Example sheet-2, and Comparative Example laminated glass-2 were obtained in a similar manner to Comparative Example 1 except that PEs-1 was not added. The resulting Comparative Example sheet-2 and Comparative Example laminated glass-2 were evaluated in a similar manner to Example 1. Composition of the polyvinyl acetal composition is shown in Table 8. Evaluation results of the sheet and the laminated glass are shown in Table 9.

Comparative Example 3

Comparative Example composition-3, Comparative Example sheet-3, and Comparative Example laminated polyvinyl acetal composition is shown in Table 8. Evaluation results of the sheet and the laminated glass are shown in Table 9.

Comparative Example 4

Comparative Example composition-4, Comparative Example sheet-4, and Comparative Example laminated glass-4 were obtained in a similar manner to Example 3 except that PEs-1 was not added and 11 parts by mass of 3G8 was added. The resulting Comparative Example sheet-4 and Comparative Example laminated glass-4 were evaluated in a similar manner to Example 1. Composition of the polyvinyl acetal composition is shown in Table 8. Evaluation results of the sheet and the laminated glass are shown in Table 9.

Comparative Example 5

Comparative Example composition-5, Comparative Example sheet-5, and Comparative Example laminated glass-5 were obtained in a similar manner to Example 3 except that PEs-1 was not added and 70 parts by mass of 3G8 was added. The resulting Comparative Example sheet-5 and Comparative Example laminated glass-5 were evaluated in a similar manner to Example 1. Composition of the polyvinyl acetal composition is shown in Table 8. Evaluation results of the sheet and the laminated glass are shown in Table 9.

Comparative Example 6

Comparative Example composition-6 was obtained in a similar manner to Example 3 except that the addition amount of PEs-1 was changed to 100 parts by mass. In Comparative Example composition-6, the polyvinyl acetal and PEs-1 were not completely compatible with each other, and PEs-1 was bleeding (oozing). Composition of the polyvinyl acetal composition is shown in Table 8.

Example 44

Polyvinyl acetal composition-44, sheet-44, and laminated glass-44 were obtained in a similar manner to Example 43 except that 15 parts by mass of PVB-3 was used in place of PVB-2. The average amount of remaining hydroxyl groups of all the polyvinyl acetals was 31.0 mol %. The resulting sheet-44 and laminated glass-44 were evaluated in a similar manner to Example 1. Composition of the polyvinyl acetal

TABLE 8

| | polyvinyl acetal (A) | polyvinyl acetal (B) | | | average amount of remaining hydroxyl | polyester containing a hydroxyl group | | | compound containing no hydroxyl group | | | |
|---|---|---|---|---|---|---|---|---|---|---|---|---|
| | (100 parts by mass) | kind | parts by mass | \|X − Y\| (mol %) | groups of all PVBs (mol %) | kind | parts by mass | times by mass*[2] | kind | parts by mass | times by mass*[3] | total times by mass*[4] |
| Comparative Example 1 | PVB-1 | PVB-4 | 15 | 10.6 | 28.6 | PEs-1 | 3 | 0.03 | 3G8 | 38 | 0.33 | 0.36 |
| Comparative Example 2 | PVB-1 | PVB-4 | 15 | 10.6 | 28.6 | | | | 3G8 | 38 | 0.33 | 0.33 |
| Comparative Example 3 | PVB-7 | PVB-3 | 60 | 3.4 | 35.3 | | | | 3G8 | 50 | 0.31 | 0.31 |
| Comparative Example 4 | PVB-1 | PVB-4 | 15 | 10.6 | 28.6 | | | | 3G8 | 11 | 0.10 | 0.10 |
| Comparative Example 5 | PVB-1 | PVB-4 | 15 | 10.6 | 28.6 | | | | 3G8 | 70 | 0.61 | 0.61 |
| Comparative Example 6 | PVB-1 | PVB-4 | 15 | 10.6 | 28.6 | PEs-1 | 100 | 0.87 | | | | 0.87 |

*[2]multiple of mass of polyester with respect to the total mass of polyvinyl acetal (A) and polyvinyl acetal (B)
*[3]multiple of mass of a compound containing no hydroxyl group with respect to the total mass of polyvinyl acetal (A) and polyvinyl acetal (B)
*[4]multiple of total mass of polyester and a compound containing no hydroxyl group with respect to the total mass of polyvinyl acetal (A) and polyvinyl acetal (B)

TABLE 9

| | water absorption rate of sheet (% by mass) | cloudiness | bleeding | peak temperature of tanδ (° C.) | haze of laminated glass (%) |
|---|---|---|---|---|---|
| Comparative Example 1 | 1.1 | observed | observed | 28 | 8.6 |
| Comparative Example 2 | 1.1 | observed | observed | 28 | 8.3 |
| Comparative Example 3 | 1.0 | observed | observed | 26 | 10.8 |
| Comparative Example 4 | 1.3 | observed | observed | 43 | 4.5 |
| Comparative Example 5 | 1.0 | observed | observed | 12 | 18.3 |
| Comparative Example 6 | not evaluated | not evaluated | not evaluated | not evaluated | not evaluated |

Example 43

Polyvinyl acetal composition-43, sheet-43, and laminated glass-43 were obtained in a similar manner to Example 1 except that 100 parts by mass of PVB-1, 15 parts by mass of PVB-2, and 38 parts by mass of polypropylene oxide-1 (PPO-1: obtained by ring-opening addition polymerization of propylene oxide to 1,2-propylene glycol, the number of hydroxyl groups per molecule of polypropylene oxide: 2, number average molecular weight based on a hydroxyl value: 400, average hydroxyl value: 280 mgKOH/g, content of propylene oxide units: 100% by mass) were used. The average amount of remaining hydroxyl groups of all the polyvinyl acetals was 29.1 mol %. The resulting sheet-43 and laminated glass-43 were evaluated in a similar manner to Example 1. Composition of the polyvinyl acetal composition is shown in Table 10. Evaluation results of the sheet and the laminated glass are shown in Table 12.

composition is shown in Table 10. Evaluation results of the sheet and the laminated glass are shown in Table 12.

Example 45

Polyvinyl acetal composition-45, sheet-45, and laminated glass-45 were obtained in a similar manner to Example 43 except that 15 parts by mass of PVB-4 was used in place of PVB-2. The average amount of remaining hydroxyl groups of all the polyvinyl acetals was 28.6 mol %. The resulting sheet-45 and laminated glass-45 were evaluated in a similar manner to Example 1. Composition of the polyvinyl acetal composition is shown in Table 10. Evaluation results of the sheet and the laminated glass are shown in Table 12.

Example 46

Polyvinyl acetal composition-46, sheet-46, and laminated glass-46 were obtained in a similar manner to Example 43 except that 5 parts by mass of PVB-4 was used in place of PVB-2, and the use amount of PPO-1 was changed to 35 parts by mass. The average amount of remaining hydroxyl groups of all the polyvinyl acetals was 29.5 mol %. The resulting sheet-46 and laminated glass-46 were evaluated in a similar manner to Example 1. Composition of the polyvinyl acetal composition is shown in Table 10. Evaluation results of the sheet and the laminated glass are shown in Table 12.

Example 47

Polyvinyl acetal composition-47, sheet-47, and laminated glass-47 were obtained in a similar manner to Example 43 except that 40 parts by mass of PVB-4 was used in place of PVB-2, and the use amount of PPO-1 was changed to 47 parts by mass. The average amount of remaining hydroxyl groups of all the polyvinyl acetals was 27.0 mol %. The resulting sheet-47 and laminated glass-47 were evaluated in a similar manner to Example 1. Composition of the polyvinyl acetal composition is shown in Table 10. Evaluation results of the sheet and the laminated glass are shown in Table 12.

Example 48

Polyvinyl acetal composition-48, sheet-48, and laminated glass-48 were obtained in a similar manner to Example 43 except that 80 parts by mass of PVB-4 was used in place of PVB-2, and the use amount of PPO-1 was changed to 60 parts by mass. The average amount of remaining hydroxyl groups of all the polyvinyl acetals was 25.3 mol %. The resulting sheet-48 and laminated glass-48 were evaluated in a similar manner to Example 1. Composition of the polyvinyl acetal composition is shown in Table 10. Evaluation results of the sheet and the laminated glass are shown in Table 12.

Example 49

Polyvinyl acetal composition-49, sheet-49, and laminated glass-49 were obtained in a similar manner to Example 43 except that 15 parts by mass of PVB-5 was used in place of PVB-2. The average amount of remaining hydroxyl groups of all the polyvinyl acetals was 29.3 mol %. The resulting sheet-49 and laminated glass-49 were evaluated in a similar manner to Example 1. Composition of the polyvinyl acetal composition is shown in Table 10. Evaluation results of the sheet and the laminated glass are shown in Table 12.

Example 50

Polyvinyl acetal composition-50, sheet-50, and laminated glass-50 were obtained in a similar manner to Example 43 except that 15 parts by mass of PVB-6 was used in place of PVB-2. The average amount of remaining hydroxyl groups of all the polyvinyl acetals was 28.8 mol %. The resulting sheet-50 and laminated glass-50 were evaluated in a similar manner to Example 1. Composition of the polyvinyl acetal composition is shown in Table 10. Evaluation results of the sheet and the laminated glass are shown in Table 12.

Example 51

Polyvinyl acetal composition-51, sheet-51, and laminated glass-51 were obtained in a similar manner to Example 43 except that 15 parts by mass of PVB-7 was used in place of PVB-2. The average amount of remaining hydroxyl groups of all the polyvinyl acetals was 30.5 mol %. The resulting sheet-51 and laminated glass-51 were evaluated in a similar manner to Example 1. Composition of the polyvinyl acetal composition is shown in Table 10. Evaluation results of the sheet and the laminated glass are shown in Table 12.

Example 52

Polyvinyl acetal composition-52, sheet-52, and laminated glass-52 were obtained in a similar manner to Example 43 except that 15 parts by mass of PVB-8 was used in place of PVB-2. The average amount of remaining hydroxyl groups of all the polyvinyl acetals was 28.3 mol %. The resulting sheet-52 and laminated glass-52 were evaluated in a similar manner to Example 1. Composition of the polyvinyl acetal composition is shown in Table 10. Evaluation results of the sheet and the laminated glass are shown in Table 12.

Example 53

Polyvinyl acetal composition-53, sheet-53, and laminated glass-53 were obtained in a similar manner to Example 43 except that 100 parts by mass of PVB-7 was used in place of PVB-1, 60 parts by mass of PVB-3 was used in place of PVB-2, and the use amount of PPO-1 was changed to 53 parts by mass. The average amount of remaining hydroxyl groups of all the polyvinyl acetals was 35.3 mol %. The resulting sheet-53 and laminated glass-53 were evaluated in a similar manner to Example 1. Composition of the polyvinyl acetal composition is shown in Table 10. Evaluation results of the sheet and the laminated glass are shown in Table 12.

Example 54

Polyvinyl acetal composition-54, sheet-54, and laminated glass-54 were obtained in a similar manner to Example 45 except that the use amount of PPO-1 was changed to 27 parts by mass. The resulting sheet-54 and laminated glass-54 were evaluated in a similar manner to Example 1. Composition of the polyvinyl acetal composition is shown in Table 10. Evaluation results of the sheet and the laminated glass are shown in Table 12.

Example 55

Polyvinyl acetal composition-55, sheet-55, and laminated glass-55 were obtained in a similar manner to Example 45 except that the use amount of PPO-1 was changed to 13 parts by mass. The resulting sheet-55 and laminated glass-55 were evaluated in a similar manner to Example 1. Composition of the polyvinyl acetal composition is shown in Table 10. Evaluation results of the sheet and the laminated glass are shown in Table 12.

Example 56

Polyvinyl acetal composition-56, sheet-56, and laminated glass-56 were obtained in a similar manner to Example 45 except that the use amount of PPO-1 was changed to 20 parts by mass, and 20 parts by mass of 3G8 was further added. The resulting sheet-56 and laminated glass-56 were evaluated in a similar manner to Example 1. Composition of the polyvinyl acetal composition is shown in Table 10. Evaluation results of the sheet and the laminated glass are shown in Table 12.

Example 57

Polyvinyl acetal composition-57, sheet-57, and laminated glass-57 were obtained in a similar manner to Example 45 except that the use amount of PPO-1 was changed to 12 parts by mass, and 30 parts by mass of 3G8 was further added. The resulting sheet-57 and laminated glass-57 were evaluated in a similar manner to Example 1. Composition of the polyvinyl acetal composition is shown in Table 10. Evaluation results of the sheet and the laminated glass are shown in Table 12.

Example 58

Polyvinyl acetal composition-58, sheet-58, and laminated glass-58 were obtained in a similar manner to Example 45 except that the use amount of PPO-1 was changed to 8 parts by mass, and 33 parts by mass of 3G8 was further added. The resulting sheet-58 and laminated glass-58 were evaluated in a similar manner to Example 1. Composition of the polyvinyl acetal composition is shown in Table 10. Evaluation results of the sheet and the laminated glass are shown in Table 12.

Example 59

Polyvinyl acetal composition-59, sheet-59, and laminated glass-59 were obtained in a similar manner to Example 45 except that 45 parts by mass of polypropylene oxide-2 (PPO-2: obtained by ring-opening addition polymerization of propylene oxide to 1,2-propylene glycol, the number of hydroxyl groups per molecule of polypropylene oxide: 2, number average molecular weight based on a hydroxyl value: 800, average hydroxyl value: 140 mgKOH/g, content of propylene oxide units: 100% by mass) was used in place of PPO-1. The resulting sheet-59 and laminated glass-59 were evaluated in a similar manner to Example 1. Composition of the polyvinyl acetal composition is shown in Table 10. Evaluation results of the sheet and the laminated glass are shown in Table 12.

Example 60

Polyvinyl acetal composition-60, sheet-60, and laminated glass-60 were obtained in a similar manner to Example 45 except that 55 parts by mass of polypropylene oxide-3 (PPO-3: obtained by ring-opening addition polymerization of propylene oxide to 1,2-propylene glycol, the number of hydroxyl groups per molecule of polypropylene oxide: 2, number average molecular weight based on a hydroxyl value: 1500, average hydroxyl value: 75 mgKOH/g, content of propylene oxide units: 100% by mass) was used in place of PPO-1. The resulting sheet-60 and laminated glass-60 were evaluated in a similar manner to Example 1. Composition of the polyvinyl acetal composition is shown in Table 10. Evaluation results of the sheet and the laminated glass are shown in Table 12.

Example 61

Polyvinyl acetal composition-61, sheet-61, and laminated glass-61 were obtained in a similar manner to Example 45 except that 23 parts by mass of PPO-2 was used in place of PPO-1, and 20 parts by mass of 3G8 was further added. The resulting sheet-61 and laminated glass-61 were evaluated in a similar manner to Example 1. Composition of the polyvinyl acetal composition is shown in Table 10. Evaluation results of the sheet and the laminated glass are shown in Table 12.

Example 62

Polyvinyl acetal composition-62, sheet-62, and laminated glass-62 were obtained in a similar manner to Example 45 except that 40 parts by mass of polypropylene oxide-4 (PPO-4: obtained by ring-opening addition polymerization of propylene oxide to 2-ethyl-1-hexanol, the number of hydroxyl groups per molecule of polypropylene oxide: 1, number average molecular weight based on a hydroxyl value: 500, average hydroxyl value: 112 mgKOH/g, ratio of a part obtained by ring-opening addition polymerization of propylene oxide: 74% by mass) was used in place of PPO-1. The resulting sheet-62 and laminated glass-62 were evaluated in a similar manner to Example 1. Composition of the polyvinyl acetal composition is shown in Table 10. Evaluation results of the sheet and the laminated glass are shown in Table 12.

Example 63

Polyvinyl acetal composition-63, sheet-63, and laminated glass-63 were obtained in a similar manner to Example 45 except that 45 parts by mass of polypropylene oxide-5 (PPO-5: obtained by ring-opening addition polymerization of propylene oxide to triethylene glycol, the number of hydroxyl groups per molecule of polypropylene oxide: 2, number average molecular weight based on a hydroxyl value: 750, average hydroxyl value: 149 mgKOH/g, content of propylene oxide units: 80% by mass) was used in place of PPO-1. The resulting sheet-63 and laminated glass-63 were evaluated in a similar manner to Example 1. Composition of the polyvinyl acetal composition is shown in Table 10. Evaluation results of the sheet and the laminated glass are shown in Table 12.

Example 64

Polyvinyl acetal composition-64, sheet-64, and laminated glass-64 were obtained in a similar manner to Example 45 except that 40 parts by mass of polypropylene oxide-6 (PPO-6: obtained by ring-opening addition polymerization of propylene oxide to 2-ethylhexanoic acid, the number of hydroxyl groups per molecule of polypropylene oxide: 1, number average molecular weight based on a hydroxyl value: 450, average hydroxyl value: 124 mgKOH/g, content of propylene oxide units: 68% by mass) was used in place of PPO-1. The resulting sheet-64 and laminated glass-64 were evaluated in a similar manner to Example 1. Composition of the polyvinyl acetal composition is shown in Table 10. Evaluation results of the sheet and the laminated glass are shown in Table 12.

Example 65

Polyvinyl acetal composition-65, sheet-65, and laminated glass-65 were obtained in a similar manner to Example 45 except that 23 parts by mass of PPO-6 was used in place of PPO-1, and 22 parts by mass of 3G8 was further added. The resulting sheet-65 and laminated glass-65 were evaluated in a similar manner to Example 1. Composition of the polyvinyl acetal composition is shown in Table 10. Evaluation results of the sheet and the laminated glass are shown in Table 12.

Example 66

Polyvinyl acetal composition-66, sheet-66, and laminated glass-66 were obtained in a similar manner to Example 45 except that 42 parts by mass of polypropylene oxide-7 (PPO-7: obtained by ring-opening addition polymerization of propylene oxide to glycerin, the number of hydroxyl groups per molecule of polypropylene oxide: 3, number average molecular weight based on a hydroxyl value: 500, average hydroxyl value: 336 mgKOH/g, content of propylene oxide units: 82% by mass) was used in place of PPO-1. The resulting sheet-66 and laminated glass-66 were evaluated in a similar manner to Example 1. Composition of the polyvinyl acetal composition is shown in Table 10. Evaluation results of the sheet and the laminated glass are shown in Table 12.

Comparative Example 7

Comparative Example composition-7, Comparative Example sheet-7, and Comparative Example laminated glass-7 were obtained in a similar manner to Example 45 except that the addition amount of PPO-1 was changed to 3 parts by mass, and 38 parts by mass of 3G8 was further added. The resulting Comparative Example sheet-7 and Comparative Example laminated glass-7 were evaluated in a similar manner to Example 1. Composition of the polyvinyl acetal composition is shown in Table 11. Evaluation results of the sheet and the laminated glass are shown in Table 12.

Comparative Example 8

Comparative Example composition-8, Comparative Example sheet-8, and Comparative Example laminated glass-8 were obtained in a similar manner to Example 53 except that PPO-1 was not added and 40 parts by mass of 3G8 was added. The resulting Comparative Example sheet-8 and Comparative Example laminated glass-8 were evaluated in a similar manner to Example 1. Composition of the polyvinyl acetal composition is shown in Table 11. Evaluation results of the sheet and the laminated glass are shown in Table 12.

Comparative Example 9

Comparative Example composition-9, Comparative Example sheet-9, and Comparative Example laminated glass-9 were obtained in a similar manner to Example 56 except that PPO-1 was not added and 13 parts by mass of 3G8 was added. The resulting Comparative Example sheet-9 and Comparative Example laminated glass-9 were evaluated in a similar manner to Example 1. Composition of the polyvinyl acetal composition is shown in Table 11. Evaluation results of the sheet and the laminated glass are shown in Table 12.

Comparative Example 10

Comparative Example composition-10, Comparative Example sheet-10, and Comparative Example laminated glass-10 were obtained in a similar manner to Example 60 except that PPO-3 was not added and 55 parts by mass of 3G8 was added. The resulting Comparative Example sheet-10 and Comparative Example laminated glass-10 were evaluated in a similar manner to Example 1. Composition of the polyvinyl acetal composition is shown in Table 11. Evaluation results of the sheet and the laminated glass are shown in Table 12.

Comparative Example 11

Comparative Example composition-11 was obtained in a similar manner to Example 45 except that the addition amount of PPO-1 was changed to 100 parts by mass. In Comparative Example composition-11, the polyvinyl acetal and PPO-1 were not completely compatible with each other, and PPO-1 was bleeding (oozing). Composition of the polyvinyl acetal composition is shown in Table 11.

TABLE 10

| | polyvinyl acetal (A) (100 parts by mass) kind | polyvinyl acetal (B) kind | parts by mass | $\|X - Y\|$ (mol %) | average amount of remaining hydroxyl groups of all PVBs (mol %) | polyalkylene oxide kind | parts by mass | times by mass*[2] | compound containing no hydroxyl group kind | parts by mass | times by mass*[3] | total times by mass*[4] |
|---|---|---|---|---|---|---|---|---|---|---|---|---|
| Example 43 | PVB-1 | PVB-2 | 15 | 6.8 | 29.1 | PPO-1 | 38 | 0.33 | | | | 0.33 |
| Example 44 | PVB-1 | PVB-3 | 15 | 7.4 | 31.0 | PPO-1 | 38 | 0.33 | | | | 0.33 |
| Example 45 | PVB-1 | PVB-4 | 15 | 10.6 | 28.6 | PPO-1 | 38 | 0.33 | | | | 0.33 |
| Example 46 | PVB-1 | PVB-4 | 5 | 10.6 | 29.5 | PPO-1 | 35 | 0.33 | | | | 0.33 |
| Example 47 | PVB-1 | PVB-4 | 40 | 10.6 | 27.0 | PPO-1 | 47 | 0.34 | | | | 0.34 |
| Example 48 | PVB-1 | PVB-4 | 80 | 10.6 | 25.3 | PPO-1 | 60 | 0.33 | | | | 0.33 |
| Example 49 | PVB-1 | PVB-5 | 15 | 5.2 | 29.3 | PPO-1 | 38 | 0.33 | | | | 0.33 |
| Example 50 | PVB-1 | PVB-6 | 15 | 9.3 | 28.8 | PPO-1 | 38 | 0.33 | | | | 0.33 |
| Example 51 | PVB-1 | PVB-7 | 15 | 4.0 | 30.5 | PPO-1 | 38 | 0.33 | | | | 0.33 |
| Example 52 | PVB-1 | PVB-8 | 15 | 13.0 | 28.3 | PPO-1 | 38 | 0.33 | | | | 0.33 |
| Example 53 | PVB-7 | PVB-3 | 60 | 3.4 | 35.3 | PPO-1 | 53 | 0.33 | | | | 0.33 |
| Example 54 | PVB-1 | PVB-4 | 15 | 10.6 | 28.6 | PPO-1 | 27 | 0.23 | | | | 0.23 |
| Example 55 | PVB-1 | PVB-4 | 15 | 10.6 | 28.6 | PPO-1 | 13 | 0.11 | | | | 0.11 |
| Example 56 | PVB-1 | PVB-4 | 15 | 10.6 | 28.6 | PPO-1 | 20 | 0.17 | 3G8 | 20 | 0.17 | 0.35 |
| Example 57 | PVB-1 | PVB-4 | 15 | 10.6 | 28.6 | PPO-1 | 12 | 0.10 | 3G8 | 30 | 0.26 | 0.37 |
| Example 58 | PVB-1 | PVB-4 | 15 | 10.6 | 28.6 | PPO-1 | 8 | 0.07 | 3G8 | 33 | 0.29 | 0.36 |
| Example 59 | PVB-1 | PVB-4 | 15 | 10.6 | 28.6 | PPO-2 | 45 | 0.39 | | | | 0.39 |
| Example 60 | PVB-1 | PVB-4 | 15 | 10.6 | 28.6 | PPO-3 | 55 | 0.48 | | | | 0.48 |
| Example 61 | PVB-1 | PVB-4 | 15 | 10.6 | 28.6 | PPO-2 | 23 | 0.20 | 3G8 | 20 | 0.17 | 0.37 |
| Example 62 | PVB-1 | PVB-4 | 15 | 10.6 | 28.6 | PPO-4 | 40 | 0.35 | | | | 0.35 |
| Example 63 | PVB-1 | PVB-4 | 15 | 10.6 | 28.6 | PPO-5 | 45 | 0.39 | | | | 0.39 |
| Example 64 | PVB-1 | PVB-4 | 15 | 10.6 | 28.6 | PPO-6 | 40 | 0.35 | | | | 0.35 |

TABLE 10-continued

| | polyvinyl acetal (A) (100 parts by mass) kind | polyvinyl acetal (B) kind | parts by mass | |X − Y| (mol %) | average amount of remaining hydroxyl groups of all PVBs (mol %) | polyalkylene oxide kind | parts by mass | times by mass*2 | compound containing no hydroxyl group kind | parts by mass | times by mass*3 | total times by mass*4 |
|---|---|---|---|---|---|---|---|---|---|---|---|---|
| Example 65 | PVB-1 | PVB-4 | 15 | 10.6 | 28.6 | PPO-6 | 23 | 0.20 | 3G8 | 22 | 0.19 | 0.39 |
| Example 66 | PVB-1 | PVB-4 | 15 | 10.6 | 28.6 | PPO-7 | 42 | 0.37 | | | | 0.37 |

*2 multiple of mass of polypropylene oxide with respect to the total mass of polyvinyl acetal (A) and polyvinyl acetal (B)
*3 multiple of mass of a compound containing no hydroxyl group with respect to the total mass of polyvinyl acetal (A) and polyvinyl acetal (B)
*4 multiple of the total mass of polypropylene oxide and an ester compound containing no hydroxyl group with respect to the total mass of polyvinyl acetal (A) and polyvinyl acetal (B)

TABLE 11

| | polyvinyl acetal (A) (100 parts by mass) kind | polyvinyl acetal (B) kind | parts by mass | |X − Y| (mol %) | average amount of remaining hydroxyl groups of all PVBs (mol %) | polyalkylene oxide kind | parts by mass | times by mass*2 | compound containing no hydroxyl group kind | parts by mass | times by mass*3 | total times by mass*4 |
|---|---|---|---|---|---|---|---|---|---|---|---|---|
| Comparative Example 2 | PVB-1 | PVB-4 | 15 | 10.6 | 28.6 | | | | 3G8 | 38 | 0.33 | 0.33 |
| Comparative Example 7 | PVB-1 | PVB-4 | 15 | 10.6 | 28.6 | PPO-1 | 3 | 0.03 | 3G8 | 38 | 0.33 | 0.36 |
| Comparative Example 8 | PVB-7 | PVB-3 | 60 | 3.4 | 35.3 | | | | 3G8 | 40 | 0.25 | 0.25 |
| Comparative Example 9 | PVB-1 | PVB-4 | 15 | 10.6 | 28.6 | | | | 3G8 | 13 | 0.11 | 0.11 |
| Comparative Example 10 | PVB-1 | PVB-4 | 15 | 10.6 | 28.6 | | | | 3G8 | 55 | 0.48 | 0.48 |
| Comparative Example 11 | PVB-1 | PVB-4 | 15 | 10.6 | 28.6 | PPO-1 | 100 | 0.87 | | | | 0.87 |

*2 multiple of mass of polypropylene oxide with respect to the total mass of polyvinyl acetal (A) and polyvinyl acetal (B)
*3 multiple of mass of a compound containing no hydroxyl group with respect to the total mass of polyvinyl acetal (A) and polyvinyl acetal (B)
*4 multiple of the total mass of polypropylene oxide and an ester compound containing no hydroxyl group with respect to the total mass of polyvinyl acetal (A) and polyvinyl acetal (B)

TABLE 12

| | water absorption rate of sheet (% by mass) | cloudiness | bleeding | peak temperature of tanδ (° C.) | haze of laminated glass (%) |
|---|---|---|---|---|---|
| Example 43 | 1.8 | not observed | not observed | 26 | 0.4 |
| Example 44 | 2.1 | not observed | not observed | 29 | 0.5 |
| Example 45 | 1.8 | not observed | not observed | 26 | 0.6 |
| Example 46 | 1.8 | not observed | not observed | 27 | 0.5 |
| Example 47 | 1.9 | not observed | not observed | 28 | 0.6 |
| Example 48 | 2.1 | not observed | not observed | 28 | 0.7 |
| Example 49 | 1.8 | not observed | not observed | 28 | 0.4 |
| Example 50 | 1.8 | not observed | not observed | 27 | 0.5 |
| Example 51 | 1.8 | not observed | not observed | 29 | 0.6 |
| Example 52 | 1.7 | not observed | not observed | 26 | 0.6 |
| Example 53 | 2.0 | not observed | not observed | 30 | 0.5 |
| Example 54 | 1.7 | not observed | not observed | 35 | 0.7 |
| Example 55 | 1.4 | not observed | not observed | 48 | 1.0 |
| Example 56 | 1.4 | not observed | not observed | 28 | 0.8 |
| Example 57 | 1.2 | not observed | not observed | 28 | 1.0 |
| Example 58 | 1.1 | slightly observed | not observed | 27 | 1.5 |
| Example 59 | 2.0 | not observed | not observed | 28 | 0.5 |
| Example 60 | 2.2 | not observed | not observed | 30 | 0.6 |
| Example 61 | 1.3 | not observed | not observed | 29 | 0.8 |
| Example 62 | 1.9 | not observed | not observed | 30 | 0.5 |
| Example 63 | 1.8 | not observed | not observed | 32 | 0.5 |
| Example 64 | 2.1 | not observed | not observed | 29 | 0.6 |
| Example 65 | 1.5 | not observed | not observed | 28 | 0.8 |
| Example 66 | 1.9 | not observed | not observed | 31 | 0.6 |
| Comparative Example 2 | 1.1 | observed | observed | 28 | 8.3 |

TABLE 12-continued

| | water absorption rate of sheet (% by mass) | cloudiness | bleeding | peak temperature of tanδ (° C.) | haze of laminated glass (%) |
|---|---|---|---|---|---|
| Comparative Example 7 | 1.1 | observed | observed | 28 | 8.3 |
| Comparative Example 8 | 1.6 | observed | observed | 28 | 17.5 |
| Comparative Example 9 | 1.3 | observed | observed | 43 | 4.4 |
| Comparative Example 10 | 1.1 | observed | observed | 21 | 12.6 |
| Comparative Example 11 | not evaluated | not evaluated | not evaluated | not evaluated | not evaluated |

Example 67

Polyvinyl acetal composition-67, sheet-67, and laminated glass-67 were obtained in a similar manner to Example 1 except that 100 parts by mass of PVB-1, 15 parts by mass of PVB-2, and 50 parts by mass of castor oil (glycerin tricarboxylate, 86% by mass of the carboxylic acid ester moieties: a ricinoleate, 13% by mass thereof: any one of a palmitate, a stearate, an oleate, a linoleate, and a linolenate, 1% by mass thereof: other carboxylic acid esters; the number of hydroxyl groups per molecule: 2.6, number average molecular weight based on a hydroxyl value: 910, average hydroxyl value: 160 mgKOH/g) were used. The average amount of remaining hydroxyl groups of all the polyvinyl acetals was 29.1 mol %. The resulting sheet-67 and laminated glass-67 were evaluated in a similar manner to Example 1. Composition of the polyvinyl acetal composition is shown in Table 13. Evaluation results of the sheet and the laminated glass are shown in Table 15.

Example 68

Polyvinyl acetal composition-68, sheet-68, and laminated glass-68 were obtained in a similar manner to Example 67 except that 15 parts by mass of PVB-3 was used in place of PVB-2. The average amount of remaining hydroxyl groups of all the polyvinyl acetals was 31.0 mol %. The resulting sheet-68 and laminated glass-68 were evaluated in a similar manner to Example 1. Composition of the polyvinyl acetal composition is shown in Table 13. Evaluation results of the sheet and the laminated glass are shown in Table 15.

Example 69

Polyvinyl acetal composition-69, sheet-69, and laminated glass-69 were obtained in a similar manner to Example 67 except that 15 parts by mass of PVB-4 was used in place of PVB-2. The average amount of remaining hydroxyl groups of all the polyvinyl acetals was 28.6 mol %. The resulting sheet-69 and laminated glass-69 were evaluated in a similar manner to Example 1. Composition of the polyvinyl acetal composition is shown in Table 13. Evaluation results of the sheet and the laminated glass are shown in Table 15.

Example 70

Polyvinyl acetal composition-70, sheet-70, and laminated glass-70 were obtained in a similar manner to Example 67 except that 5 parts by mass of PVB-4 was used in place of PVB-2, and the use amount of castor oil was changed to 44 parts by mass. The average amount of remaining hydroxyl groups of all the polyvinyl acetals was 29.5 mol %. The resulting sheet-70 and laminated glass-70 were evaluated in a similar manner to Example 1. Composition of the polyvinyl acetal composition is shown in Table 13. Evaluation results of the sheet and the laminated glass are shown in Table 15.

Example 71

Polyvinyl acetal composition-71, sheet-71, and laminated glass-71 were obtained in a similar manner to Example 67 except that 40 parts by mass of PVB-4 was used in place of PVB-2, and the use amount of castor oil was changed to 58 parts by mass. The average amount of remaining hydroxyl groups of all the polyvinyl acetals was 27.0 mol %. The resulting sheet-71 and laminated glass-71 were evaluated in a similar manner to Example 1. Composition of the polyvinyl acetal composition is shown in Table 13. Evaluation results of the sheet and the laminated glass are shown in Table 15.

Example 72

Polyvinyl acetal composition-72, sheet-72, and laminated glass-72 were obtained in a similar manner to Example 67 except that 80 parts by mass of PVB-4 was used in place of PVB-2, and the use amount of castor oil was changed to 77 parts by mass. The average amount of remaining hydroxyl groups of all the polyvinyl acetals was 25.3 mol %. The resulting sheet-72 and laminated glass-72 were evaluated in a similar manner to Example 1. Composition of the polyvinyl acetal composition is shown in Table 13. Evaluation results of the sheet and the laminated glass are shown in Table 15.

Example 73

Polyvinyl acetal composition-73, sheet-73, and laminated glass-73 were obtained in a similar manner to Example 67 except that 15 parts by mass of PVB-5 was used in place of PVB-2. The average amount of remaining hydroxyl groups of all the polyvinyl acetals was 29.3 mol %. The resulting sheet-73 and laminated glass-73 were evaluated in a similar manner to Example 1. Composition of the polyvinyl acetal composition is shown in Table 13. Evaluation results of the sheet and the laminated glass are shown in Table 15.

Example 74

Polyvinyl acetal composition-74, sheet-74, and laminated glass-74 were obtained in a similar manner to Example 67 except that 15 parts by mass of PVB-6 was used in place of PVB-2. The average amount of remaining hydroxyl groups of all the polyvinyl acetals was 28.8 mol %. The resulting sheet-74 and laminated glass-74 were evaluated in a similar manner to Example 1. Composition of the polyvinyl acetal composition is shown in Table 13. Evaluation results of the sheet and the laminated glass are shown in Table 15.

Example 75

Polyvinyl acetal composition-75, sheet-75, and laminated glass-75 were obtained in a similar manner to Example 67 except that 15 parts by mass of PVB-7 was used in place of PVB-2. The average amount of remaining hydroxyl groups of all the polyvinyl acetals was 30.5 mol %. The resulting sheet-75 and laminated glass-75 were evaluated in a similar manner to Example 1. Composition of the polyvinyl acetal composition is shown in Table 13. Evaluation results of the sheet and the laminated glass are shown in Table 15.

Example 76

Polyvinyl acetal composition-76, sheet-76, and laminated glass-76 were obtained in a similar manner to Example 67 except that 15 parts by mass of PVB-8 was used in place of PVB-2. The average amount of remaining hydroxyl groups of all the polyvinyl acetals was 28.3 mol %. The resulting sheet-76 and laminated glass-76 were evaluated in a similar manner to Example 1. Composition of the polyvinyl acetal composition is shown in Table 13. Evaluation results of the sheet and the laminated glass are shown in Table 15.

Example 77

Polyvinyl acetal composition-77, sheet-77, and laminated glass-77 were obtained in a similar manner to Example 69 except that the use amount of castor oil was changed to 70 parts by mass. The resulting sheet-77 and laminated glass-77 were evaluated in a similar manner to Example 1. Composition of the polyvinyl acetal composition is shown in Table 13. Evaluation results of the sheet and the laminated glass are shown in Table 15.

Example 78

Polyvinyl acetal composition-78, sheet-78, and laminated glass-78 were obtained in a similar manner to Example 67 except that 100 parts by mass of PVB-7 was used in place of PVB-1, 60 parts by mass of PVB-3 was used in place of PVB-2, and the use amount of castor oil was changed to 64 parts by mass. The average amount of remaining hydroxyl groups of all the polyvinyl acetals was 35.3 mol %. The resulting sheet-78 and laminated glass-78 were evaluated in a similar manner to Example 1. Composition of the polyvinyl acetal composition is shown in Table 13. Evaluation results of the sheet and the laminated glass are shown in Table 15.

Example 79

Polyvinyl acetal composition-79, sheet-79, and laminated glass-79 were obtained in a similar manner to Example 69 except that the use amount of castor oil was changed to 35 parts by mass. The resulting sheet-79 and laminated glass-79 were evaluated in a similar manner to Example 1. Composition of the polyvinyl acetal composition is shown in Table 13. Evaluation results of the sheet and the laminated glass are shown in Table 15.

Example 80

Polyvinyl acetal composition-80, sheet-80, and laminated glass-80 were obtained in a similar manner to Example 69 except that the use amount of castor oil was changed to 13 parts by mass. The resulting sheet-80 and laminated glass-80 were evaluated in a similar manner to Example 1. Composition of the polyvinyl acetal composition is shown in Table 13. Evaluation results of the sheet and the laminated glass are shown in Table 15.

Example 81

Polyvinyl acetal composition-81, sheet-81, and laminated glass-81 were obtained in a similar manner to Example 69 except that the use amount of castor oil was changed to 25 parts by mass, and 20 parts by mass of 3G8 was further added. The resulting sheet-81 and laminated glass-81 were evaluated in a similar manner to Example 1. Composition of the polyvinyl acetal composition is shown in Table 13. Evaluation results of the sheet and the laminated glass are shown in Table 15.

Example 82

Polyvinyl acetal composition-82, sheet-82, and laminated glass-82 were obtained in a similar manner to Example 69 except that the use amount of castor oil was changed to 15 parts by mass, and 30 parts by mass of 3G8 was further added. The resulting sheet-82 and laminated glass-82 were evaluated in a similar manner to Example 1. Composition of the polyvinyl acetal composition is shown in Table 13. Evaluation results of the sheet and the laminated glass are shown in Table 15.

Example 83

Polyvinyl acetal composition-83, sheet-83, and laminated glass-83 were obtained in a similar manner to Example 69 except that the use amount of castor oil was changed to 10 parts by mass, and 35 parts by mass of 3G8 was further added. The resulting sheet-83 and laminated glass-83 were evaluated in a similar manner to Example 1. Composition of the polyvinyl acetal composition is shown in Table 13. Evaluation results of the sheet and the laminated glass are shown in Table 15.

Example 84

Polyvinyl acetal composition-84, sheet-84, and laminated glass-84 were obtained in a similar manner to Example 69 except that 40 parts by mass of methyl ricinoleate (number average molecular weight based on a hydroxyl value: 312, hydroxyl value: 180 mgKOH/g) was used in place of castor oil. The resulting sheet-84 and laminated glass-84 were evaluated in a similar manner to Example 1. Composition of the polyvinyl acetal composition is shown in Table 13. Evaluation results of the sheet and the laminated glass are shown in Table 15.

Example 85

Polyvinyl acetal composition-85, sheet-85, and laminated glass-85 were obtained in a similar manner to Example 84 except that 40 parts by mass of (2-(2-(2-hydroxyethoxy)ethoxy)ethyl)2-ethylhexanoate (number average molecular weight based on a hydroxyl value: 276, hydroxyl value: 203 mgKOH/g) was used in place of methyl ricinoleate. The resulting sheet-85 and laminated glass-85 were evaluated in a similar manner to Example 1. Composition of the polyvinyl acetal composition is shown in Table 13. Evaluation results of the sheet and the laminated glass are shown in Table 15.

Example 86

Polyvinyl acetal composition-86, sheet-86, and laminated glass-86 were obtained in a similar manner to Example 69 except that 25 parts by mass of (2-(2-(2-hydroxyethoxy)ethoxy)ethyl)2-ethylhexanoate was used in place of castor oil, and 20 parts by mass of 3G8 was further added. The resulting sheet-86 and laminated glass-86 were evaluated in a similar manner to Example 1. Composition of the polyvinyl acetal composition is shown in Table 13. Evaluation results of the sheet and the laminated glass are shown in Table 15.

Comparative Example 12

Comparative Example composition-12, Comparative Example sheet-12, and Comparative Example laminated glass-12 were obtained in a similar manner to Example 69 except that the addition amount of castor oil was changed to 3 parts by mass, and 38 parts by mass of 3G8 was further added. The resulting Comparative Example sheet-12 and Comparative Example laminated glass-12 were evaluated in a similar manner to Example 1. Composition of the polyvinyl acetal composition is shown in Table 14. Evaluation results of the sheet and the laminated glass are shown in Table 15.

Comparative Example 13

Comparative Example composition-13 was obtained in a similar manner to Example 69 except that the addition amount of castor oil was changed to 100 parts by mass. In Comparative Example composition-13, the polyvinyl acetal and castor oil were not completely compatible with each other, and castor oil was bleeding (oozing). Composition of the polyvinyl acetal composition is shown in Table 14.

TABLE 13

| | polyvinyl acetal (A) (100 part by mass) | polyvinyl acetal (B) kind | parts by mass | $|X - Y|$ (mol %) | average amount of remaining hydroxyl groups of all PVBs (mol %) | ester compound containing a hydroxyl group kind | parts by mass | times by mass*2 | compound containing no hydroxyl group kind | parts by mass | times by mass*3 | total times by mass*4 |
|---|---|---|---|---|---|---|---|---|---|---|---|---|
| Example 67 | PVB-1 | PVB-2 | 15 | 6.8 | 29.1 | castor oil | 50 | 0.43 | | | | 0.43 |
| Example 68 | PVB-1 | PVB-3 | 15 | 7.4 | 31.0 | castor oil | 50 | 0.43 | | | | 0.43 |
| Example 69 | PVB-1 | PVB-4 | 15 | 10.6 | 28.6 | castor oil | 50 | 0.43 | | | | 0.43 |
| Example 70 | PVB-1 | PVB-4 | 5 | 10.6 | 29.5 | castor oil | 44 | 0.42 | | | | 0.42 |
| Example 71 | PVB-1 | PVB-4 | 40 | 10.6 | 27.0 | castor oil | 58 | 0.41 | | | | 0.41 |
| Example 72 | PVB-1 | PVB-4 | 80 | 10.6 | 25.3 | castor oil | 77 | 0.43 | | | | 0.43 |
| Example 73 | PVB-1 | PVB-5 | 15 | 5.2 | 29.3 | castor oil | 50 | 0.43 | | | | 0.43 |
| Example 74 | PVB-1 | PVB-6 | 15 | 9.3 | 28.8 | castor oil | 50 | 0.43 | | | | 0.43 |
| Example 75 | PVB-1 | PVB-7 | 15 | 4.0 | 30.5 | castor oil | 50 | 0.43 | | | | 0.43 |
| Example 76 | PVB-1 | PVB-8 | 15 | 13.0 | 28.3 | castor oil | 50 | 0.43 | | | | 0.43 |
| Example 77 | PVB-1 | PVB-4 | 15 | 10.6 | 28.6 | castor oil | 70 | 0.61 | | | | 0.61 |
| Example 78 | PVB-7 | PVB-3 | 60 | 3.4 | 35.3 | castor oil | 64 | 0.40 | | | | 0.40 |
| Example 79 | PVB-1 | PVB-4 | 15 | 10.6 | 28.6 | castor oil | 35 | 0.30 | | | | 0.30 |
| Example 80 | PVB-1 | PVB-4 | 15 | 10.6 | 28.6 | castor oil | 13 | 0.11 | | | | 0.11 |
| Example 81 | PVB-1 | PVB-4 | 15 | 10.6 | 28.6 | castor oil | 25 | 0.22 | 3G8 | 20 | 0.17 | 0.39 |
| Example 82 | PVB-1 | PVB-4 | 15 | 10.6 | 28.6 | castor oil | 15 | 0.13 | 3G8 | 30 | 0.26 | 0.39 |
| Example 83 | PUB-1 | PVB-4 | 15 | 10.6 | 28.6 | castor oil | 10 | 0.09 | 3G8 | 35 | 0.30 | 0.39 |
| Example 84 | PVB-1 | PVB-4 | 15 | 10.6 | 28.6 | methyl ricinoleate | 40 | 0.35 | | | | 0.35 |
| Example 85 | PVB-1 | PVB-4 | 15 | 10.6 | 28.6 | *5 | 40 | 0.35 | | | | 0.35 |
| Example 86 | PVB-1 | PVB-4 | 15 | 10.6 | 28.6 | *5 | 25 | 0.22 | 3G8 | 20 | 0.17 | 0.39 |

*2 multiple of mass of an ester compound containing a hydroxyl group with respect to the total mass of polyvinyl acetal (A) and polyvinyl acetal (B)
*3 multiple of mass of a compound containing no hydroxyl group with respect to the total mass of polyvinyl acetal (A) and polyvinyl acetal (B)
*4 multiple of the total mass of an ester compound containing a hydroxyl group and a compound containing no hydroxyl group with respect to the total mass of polyvinyl acetal (A) and polyvinyl acetal (B)
*5: {2-[2-(2-hydroxyethoxy)ethoxy]ethyl}2-ethylhexanoate

TABLE 14

| | polyvinyl acetal (A) (100 parts by mass) | polyvinyl acetal (B) kind | parts by mass | $|X - Y|$ (mol %) | average amount of remaining hydroxyl groups of all PVBs (mol %) | ester compound containing a hydroxyl group kind | parts by mass | times by mass*2 | compound containing no hydroxyl group kind | parts by mass | times by mass*3 | total times by mass*4 |
|---|---|---|---|---|---|---|---|---|---|---|---|---|
| Comparative Example 2 | PVB-1 | PVB-4 | 15 | 10.6 | 28.6 | | | | 3G8 | 38 | 0.33 | 0.33 |
| Comparative Example 5 | PVB-1 | PVB-4 | 15 | 10.6 | 28.6 | | | | 3G8 | 70 | 0.61 | 0.61 |
| Comparative Example 8 | PVB-7 | PVB-3 | 60 | 3.4 | 35.3 | | | | 3G8 | 40 | 0.25 | 0.25 |

TABLE 14-continued

| | polyvinyl acetal (A) (100 parts by mass) | polyvinyl acetal (B) kind | polyvinyl acetal (B) parts by mass | \|X − Y\| (mol %) | average amount of remaining hydroxyl groups of all PVBs (mol %) | ester compound containing a hydroxyl group kind | ester compound containing a hydroxyl group parts by mass | ester compound containing a hydroxyl group times by mass*[2] | compound containing no hydroxyl group kind | compound containing no hydroxyl group parts by mass | compound containing no hydroxyl group times by mass*[3] | total times by mass*[4] |
|---|---|---|---|---|---|---|---|---|---|---|---|---|
| Comparative Example 9 | PVB-1 | PVB-4 | 15 | 10.6 | 28.6 | | | | 3G8 | 13 | 0.11 | 0.11 |
| Comparative Example 12 | PVB-1 | PVB-4 | 15 | 10.6 | 28.6 | castor oil | 3 | 0.03 | 3G8 | 38 | 0.33 | 0.36 |
| Comparative Example 13 | PVB-1 | PVB-4 | 15 | 10.6 | 28.6 | castor oil | 100 | 0.87 | | | | 0.87 |

*[2] multiple of mass of an ester compound containing a hydroxyl group with respect to the total mass of polyvinyl acetal (A) and polyvinyl acetal (B)
*[3] multiple of mass of a compound containing no hydroxyl group with respect to the total mass of polyvinyl acetal (A) and polyvinyl acetal (B)
*[4] multiple of the total mass of an ester compound containing a hydroxyl group and a compound containing no hydroxyl group with respect to the total mass of polyvinyl acetal (A) and polyvinyl acetal (B)

TABLE 15

| | water absorption rate of sheet (% by mass) | cloudiness | bleeding | peak temperature of tanδ (° C.) | haze of laminated glass (%) |
|---|---|---|---|---|---|
| Example 67 | 1.2 | not observed | not observed | 27 | 0.6 |
| Example 68 | 1.3 | not observed | not observed | 29 | 0.5 |
| Example 69 | 1.3 | not observed | not observed | 27 | 0.6 |
| Example 70 | 1.3 | not observed | not observed | 27 | 0.5 |
| Example 71 | 1.2 | not observed | not observed | 27 | 0.8 |
| Example 72 | 1.4 | not observed | not observed | 31 | 0.8 |
| Example 73 | 1.2 | not observed | not observed | 28 | 0.5 |
| Example 74 | 1.3 | not observed | not observed | 27 | 0.9 |
| Example 75 | 1.3 | not observed | not observed | 29 | 0.6 |
| Example 76 | 1.1 | not observed | not observed | 26 | 0.8 |
| Example 77 | 1.5 | not observed | not observed | 19 | 0.5 |
| Example 78 | 1.6 | not observed | not observed | 35 | 0.7 |
| Example 79 | 1.3 | not observed | not observed | 35 | 0.6 |
| Example 80 | 1.7 | not observed | not observed | 49 | 0.9 |
| Example 81 | 1.2 | not observed | not observed | 28 | 0.7 |
| Example 82 | 1.1 | not observed | not observed | 27 | 1.2 |
| Example 83 | 1.1 | slightly observed | not observed | 25 | 2.3 |
| Example 84 | 2.1 | not observed | not observed | 30 | 0.7 |
| Example 85 | 2.3 | not observed | not observed | 25 | 0.4 |
| Example 86 | 1.7 | not observed | not observed | 25 | 0.5 |
| Comparative Example 2 | 1.1 | observed | observed | 27 | 8.3 |
| Comparative Example 5 | 1.0 | observed | observed | 12 | 18.4 |
| Comparative Example 8 | 1.0 | observed | observed | 28 | 10.8 |
| Comparative Example 9 | 1.3 | observed | observed | 43 | 4.5 |
| Comparative Example 12 | 1.1 | observed | observed | 28 | 8.3 |
| Comparative Example 13 | not evaluated | not evaluated | not evaluated | not evaluated | not evaluated |

As Tables 3, 5, 7, 9, 12, and 15 indicate, the polyvinyl acetal composition of the present invention includes, as an essential component, compound (C) selected from a group consisting of a polyester containing a hydroxyl group, a polyalkylene oxide, and an ester compound containing a hydroxyl group, in such parts by mass as defined in the present invention. A sheet obtained from the polyvinyl acetal composition has thereby excellent transparency. Therefore, the polyvinyl acetal composition of the present invention can be suitably used as an interlayer film for laminated glass by molding the polyvinyl acetal composition into a sheet.

The polyvinyl acetal compositions in Examples 15 to 17, 21, 25, 35, 36, 41, 42, 56 to 58, 61, 65, 81 to 83, and 86 are obtained by simulating recycling a trim or an off-spec product of a laminated sound insulation interlayer film for laminated glass including two kinds of polyvinyl acetals having different average amounts of remaining hydroxyl groups and 3G8. For example, polyvinyl acetal composition-15 in Example 15 corresponds to a polyvinyl acetal composition obtained by further adding 50 parts by mass of PVB-1 and 20 parts by mass of PEs-1 to a composition which can be regarded as a polyvinyl acetal composition. The composition which can be regarded as a polyvinyl acetal composition is a trim or an off-spec product of a three-layered laminated product including "(a layer including PVB-1)/(a layer including PVB-4)/(a layer including PVB-1)", and includes 50 parts by mass of PVB-1, 15 parts by mass of PVB-4, and 20 parts by mass of 3G8 in the whole laminated product. From these results, the polyvinyl acetal composition of the present invention can be prepared, even when a trim or an off-spec product of a laminated sound insulation interlayer film for laminated glass is used as a raw material. A sheet having excellent transparency can be obtained. It is understood that recycling can be performed.

The invention claimed is:

1. A sheet made from a polyvinyl acetal composition comprising:
   3 to 100 parts by mass of a polyvinyl acetal B with respect to 100 parts by mass of a polyvinyl acetal A, and
   0.05 to 0.75 times by mass of a compound C with respect to the total mass of the polyvinyl acetal A and the polyvinyl acetal B,
   wherein the polyvinyl acetal A has an average amount of remaining hydroxyl groups of X mol %, wherein X is a positive number, the polyvinyl acetal B has an average amount of remaining hydroxyl groups of Y mol %, wherein Y is a positive number, and $|X-Y| \geq 3$ is satisfied,
   wherein the compound C is selected from a group consisting of a polyester containing a hydroxyl group, a polyalkylene oxide, and an ester compound containing a hydroxyl group, which is an ester compound of one molecule of an m-valent alcohol, wherein m represents an integer of 1 to 3, and n molecules, wherein n represents an integer of 1 to m, of a monovalent carboxylic acid, and
   wherein a total content of the polyvinyl acetal A and the polyvinyl acetal B in the sheet is 62 mass % or more.

2. The sheet according to claim 1, wherein X is 20 to 40 and/or Y is 15 to 45.

3. The sheet according to claim 1, wherein at least one of X and Y is 33 or less.

4. The sheet according to claim 3, wherein each of X and Y is 33 or less.

5. The sheet according to claim 1, wherein an average amount of remaining hydroxyl groups of all polyvinyl acetals included in the polyvinyl acetal composition is 19 to 33 mol %.

6. The sheet according to claim 1, wherein the compound C is a polyester containing a hydroxyl group.

7. The sheet according to claim 6, wherein the polyester containing a hydroxyl group is a condensation polymer C-1 of a polyvalent carboxylic acid and a polyhydric alcohol.

8. The sheet according to claim 6, wherein the polyester containing a hydroxyl group is a polymer C-2 of a hydroxycarboxylic acid or a lactone compound.

9. The sheet according to claim 6, wherein the polyester containing a hydroxyl group is a polycarbonate polyol C-3.

10. The sheet according to claim 1, wherein the compound C is a polyalkylene oxide.

11. The sheet according to claim 1, wherein the compound C is an ester compound containing a hydroxyl group, which is an ester compound of one molecule of an m-valent alcohol, where m represents an integer of 1 to 3, and n molecules, where n represents an integer of 1 to m, of a monovalent carboxylic acid.

12. The sheet according to claim 11, wherein the monovalent carboxylic acid contains ricinoleic acid.

13. The sheet according to claim 11, wherein the ester compound containing a hydroxyl group is castor oil.

14. The Previously Presented sheet according to claim 1, wherein the compound C contains 1 to 4 hydroxyl groups.

15. The Previously Presented sheet according to claim 1, wherein a number average molecular weight of the compound C obtained on the basis of hydroxyl value is from 200 to 2,000.

16. The sheet according to claim 1, wherein the compound C has a hydroxyl value of 50 to 600 mgKOH/g.

17. The sheet according to claim 1, comprising 0.05 to 0.55 times by mass of an ester compound of an alcohol and a carboxylic acid, containing no hydroxyl group, with respect to the total mass of polyvinyl acetal A and polyvinyl acetal B, wherein the total of a content of the compound containing no hydroxyl group and a content of compound C is 0.3 to 0.6 times by mass the total mass of polyvinyl acetal A and polyvinyl acetal B.

18. The sheet according to claim 17, wherein the ester compound of an alcohol and a carboxylic acid, containing no hydroxyl group, is triethylene glycol di(2-ethylhexanoate).

19. The sheet according to claim 1, wherein the polyvinyl acetal A is obtained by acetalizing a polyvinyl alcohol having a viscosity average polymerization degree of 1,000 to 2,500.

20. A laminated glass article comprising the sheet according to claim 1.

* * * * *